(12) United States Patent
Martell

(10) Patent No.: US 12,256,811 B2
(45) Date of Patent: Mar. 25, 2025

(54) SNAP SYSTEM COMPRISING MATING RIVET

(71) Applicant: KARSTEN MANUFACTURING CORPORATION, Phoenix, AZ (US)

(72) Inventor: James D. Martell, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

(21) Appl. No.: 18/460,465

(22) Filed: Sep. 1, 2023

(65) Prior Publication Data

US 2023/0413956 A1    Dec. 28, 2023

Related U.S. Application Data

(63) Continuation of application No. 17/519,482, filed on Nov. 4, 2021, now Pat. No. 11,758,989.

(60) Provisional application No. 63/109,779, filed on Nov. 4, 2020.

(51) Int. Cl.
*A44B 17/00* (2006.01)
*F16B 19/10* (2006.01)

(52) U.S. Cl.
CPC ...... *A44B 17/0005* (2013.01); *A44B 17/0064* (2013.01); *F16B 19/1036* (2013.01)

(58) Field of Classification Search
CPC ............ A44B 17/0005; A44B 17/0064; A44B 17/0047; F16B 19/1036; F16B 5/0664; A63B 55/00; A63B 55/40; A63B 55/408; A63B 55/53; A63B 55/57; A63B 71/0036; A63B 55/406; A63B 2210/50; A63B 2225/68; A63B 55/50

See application file for complete search history.

(56) References Cited

U.S. PATENT DOCUMENTS

| 359,614 A | 3/1887 | Kbaetzer |
| 400,865 A | 4/1889 | Mandrill |
| 1,831,295 A | 11/1931 | Fenton |

(Continued)

FOREIGN PATENT DOCUMENTS

| CN | 103079420 | 5/2013 |
| JP | 2016079520 | 5/2016 |

(Continued)

*Primary Examiner* — David M Upchurch

(57) ABSTRACT

The present disclosure is related to a snap system including a mating component and a snap component that connect by means of a snap fit or otherwise. The mating component simplifies the assembly process by combining a structural component and an attachment point. The snap component is associated with a removable component that mates with the attachment point of the mating component. The snap system includes a mating component that combines a structural component to secure a material and an attachment point to secure a snap component. The design of the structural component allows the mating component to be used with a variety of materials having a variable thickness. The mating component is a versatile feature as the structural component self-adjusts to the thickness of the material provided. The snap system decreases the amount of components necessary for manufacturing which may decrease the cost and improve the visual appeal.

20 Claims, 16 Drawing Sheets

(56) References Cited

U.S. PATENT DOCUMENTS

| | | | |
|---|---|---|---|
| 1,831,296 A | | 11/1931 | Fenton |
| 1,873,370 A | | 8/1932 | Ford |
| 2,328,023 A | * | 8/1943 | Lang ................... F16B 19/1036 411/363 |
| 2,489,032 A | | 11/1949 | Huelster |
| 2,819,506 A | | 1/1958 | Ashworth |
| 3,049,777 A | | 8/1962 | Lewin |
| 3,309,747 A | | 3/1967 | Smith |
| 3,613,181 A | | 10/1971 | Taylor |
| 3,869,766 A | * | 3/1975 | Raymond .......... A44B 17/0029 24/691 |
| 4,249,586 A | | 2/1981 | Setani |
| 4,253,226 A | * | 3/1981 | Takeda ............... A44B 17/0035 264/249 |
| 4,562,624 A | * | 1/1986 | Kanzaka ............ A44B 17/0035 24/691 |
| 4,847,959 A | | 7/1989 | Shimada |
| 5,771,523 A | * | 6/1998 | Rudolph ................ A63B 57/60 15/209.1 |
| 5,933,929 A | * | 8/1999 | Kawakami ......... A44B 17/0035 24/324 |
| 6,115,872 A | * | 9/2000 | Welsh .................... A63B 57/60 206/315.3 |
| 7,179,032 B2 | | 2/2007 | Guy |
| D642,089 S | | 7/2011 | Chan |
| D678,816 S | | 3/2013 | Chan |
| D689,395 S | | 9/2013 | Chan |
| 8,539,652 B2 | | 9/2013 | Richardson |
| 9,179,743 B2 | * | 11/2015 | Momose ............ A44B 17/0029 |
| 10,080,402 B2 | * | 9/2018 | Chen .................. A44B 17/0082 |
| 10,130,148 B1 | | 11/2018 | Au |
| 10,568,395 B2 | | 2/2020 | Hayashi |
| D884,552 S | | 5/2020 | Chen |
| 11,428,257 B2 | | 8/2022 | Stevick |
| 2007/0284022 A1 | | 12/2007 | Hall |
| 2017/0347756 A1 | * | 12/2017 | Chen .................. A44B 17/0082 |
| 2018/0368531 A1 | * | 12/2018 | Steinke, II ............... A44B 1/32 |

FOREIGN PATENT DOCUMENTS

| | | |
|---|---|---|
| JP | 3220134 | 2/2019 |
| WO | 2004095966 | 11/2004 |
| WO | 2005032293 | 4/2005 |
| WO | 2020109101 | 6/2020 |

\* cited by examiner

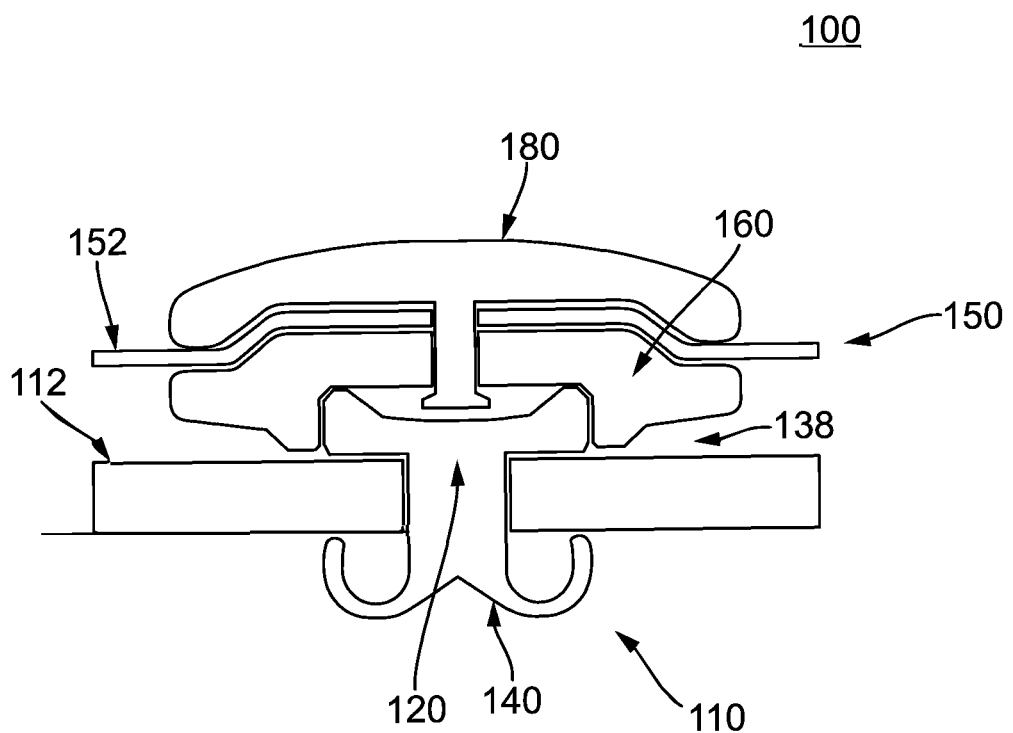
FIG. 1A

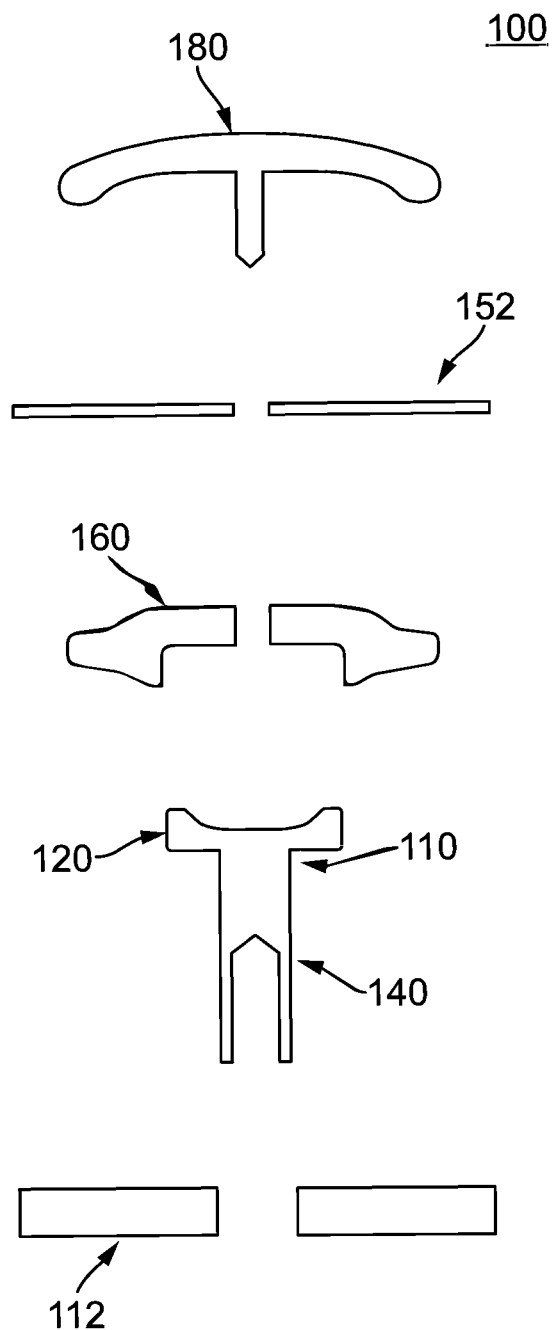
FIG. 1B

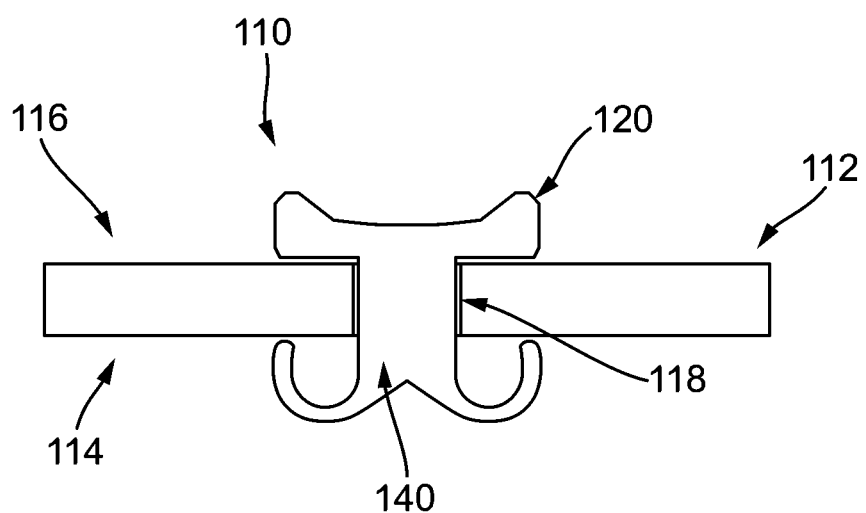
FIG. 2A

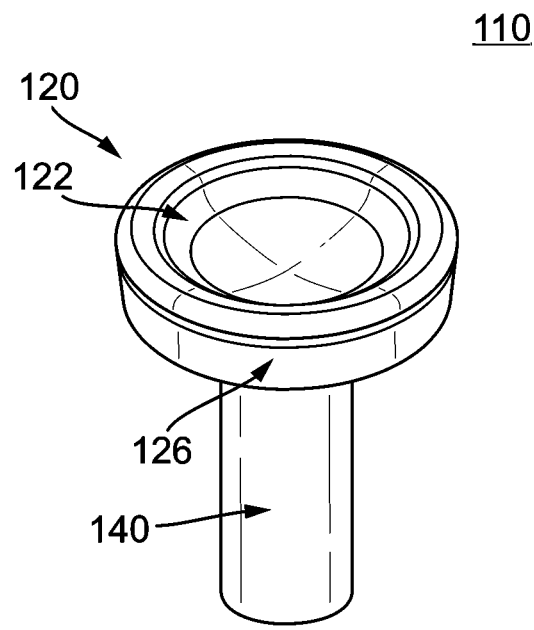
FIG. 2B
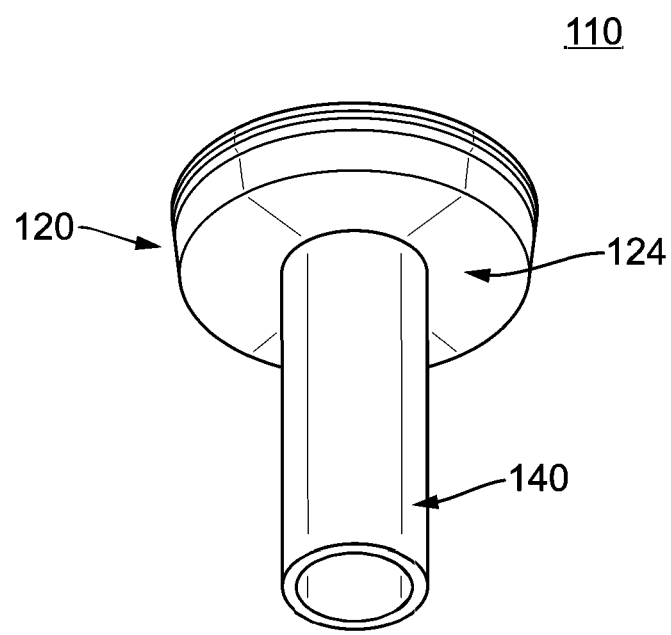
FIG. 2C

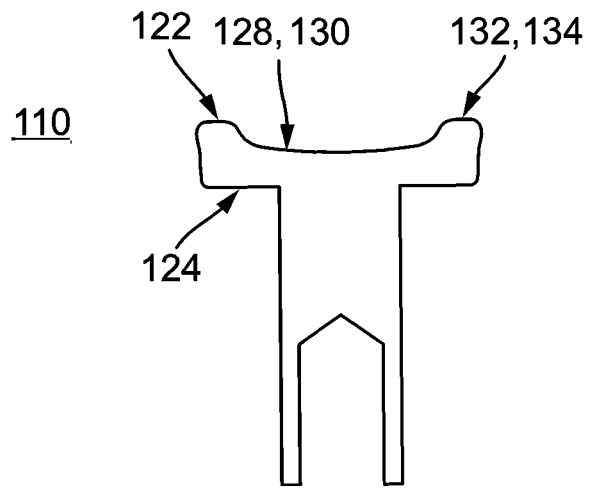
FIG. 2D
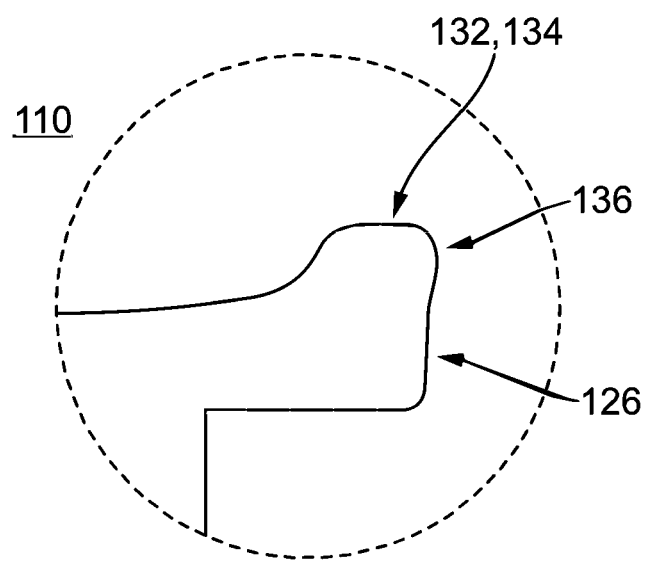
FIG. 2E

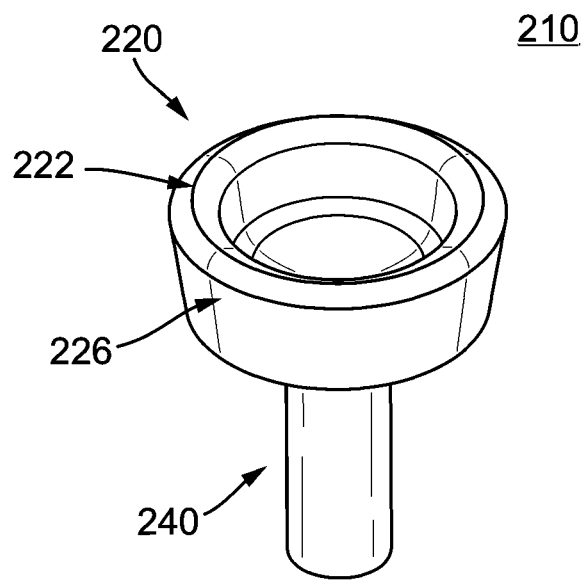
FIG. 3A
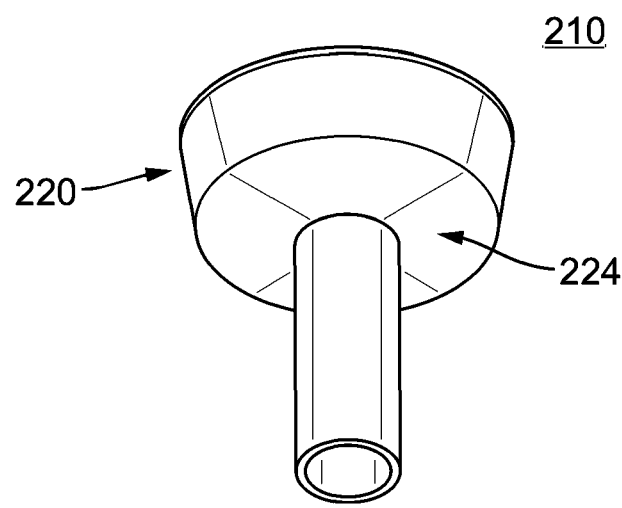
FIG. 3B

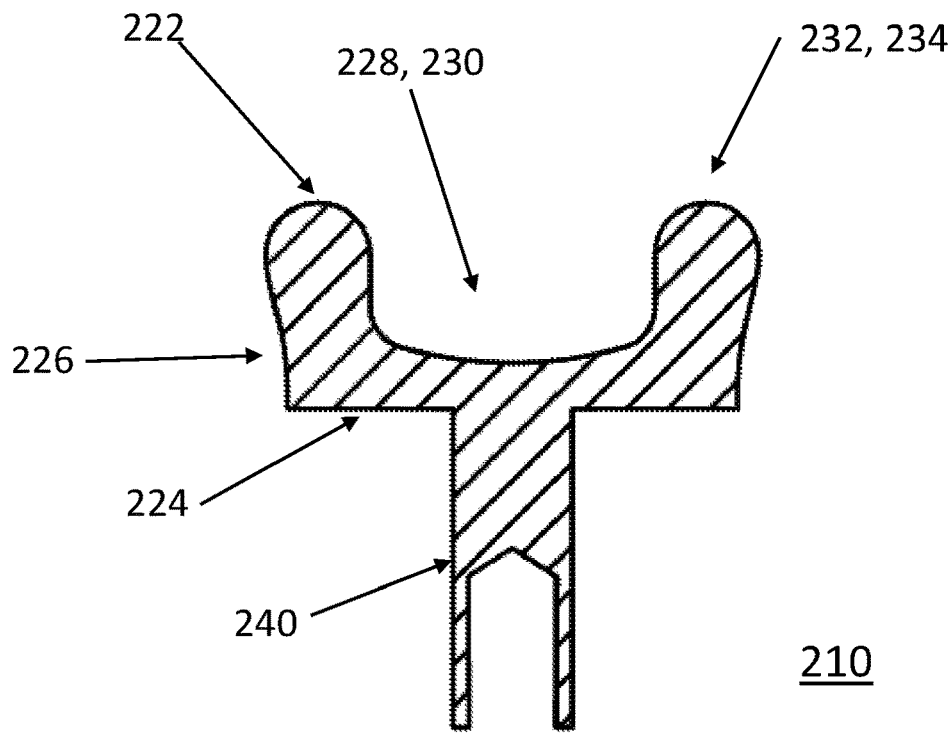
FIG. 3C
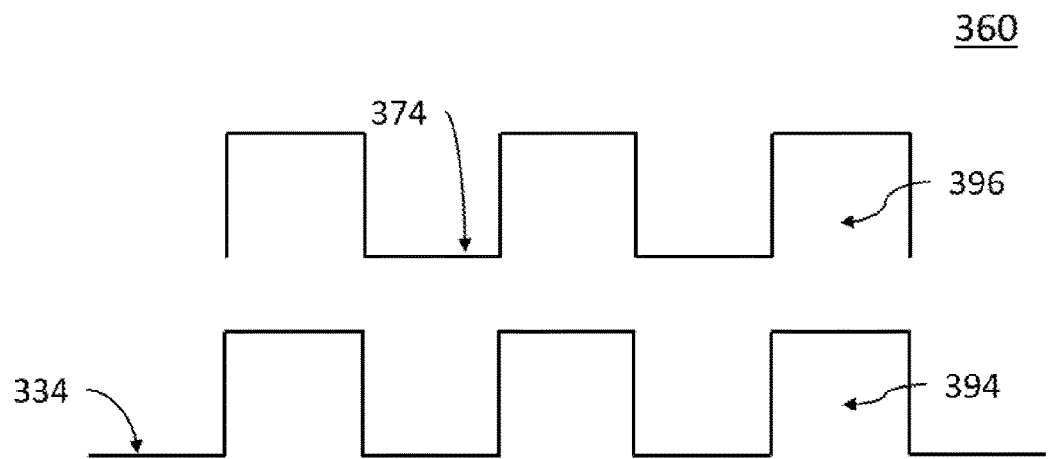
FIG. 3D

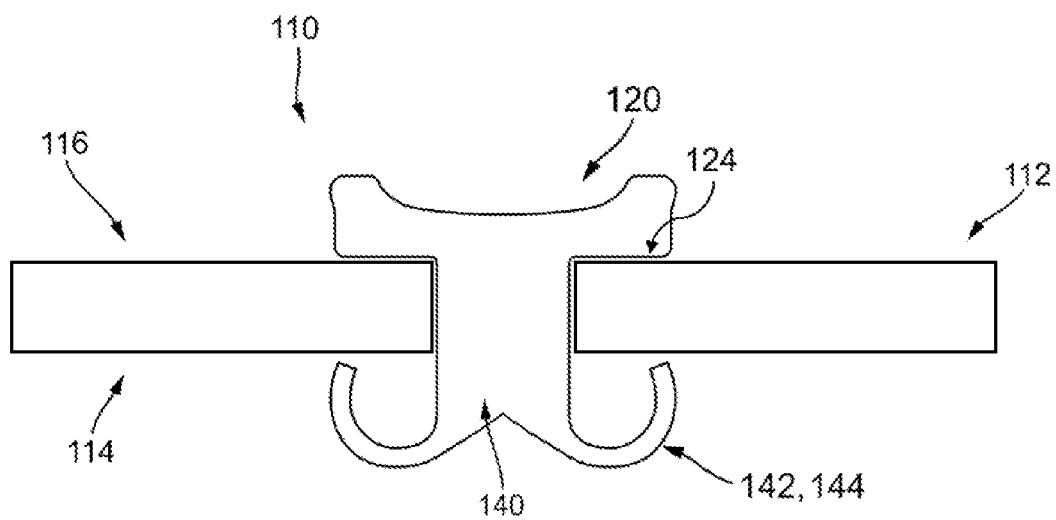
FIG. 4A
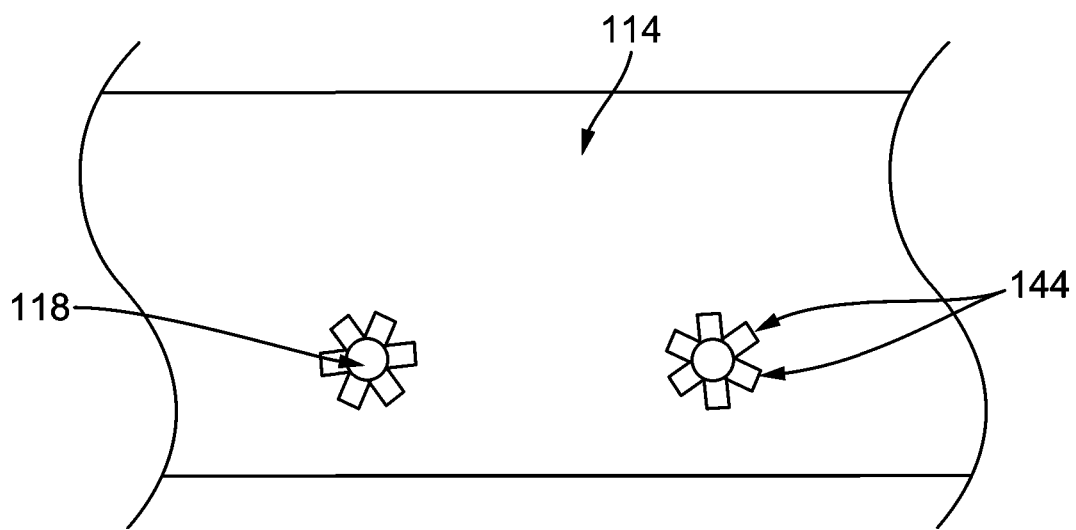
FIG. 4B

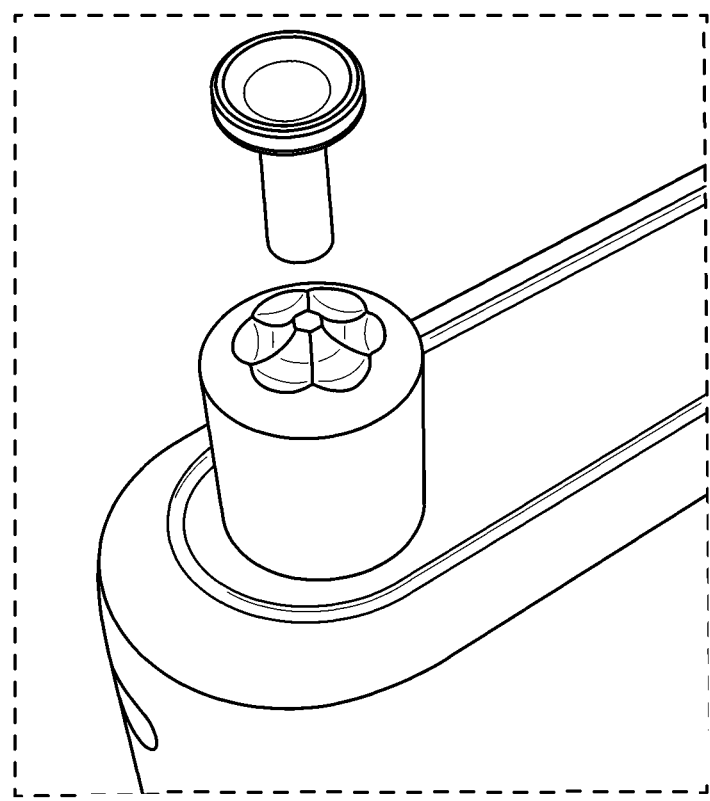
FIG. 4C
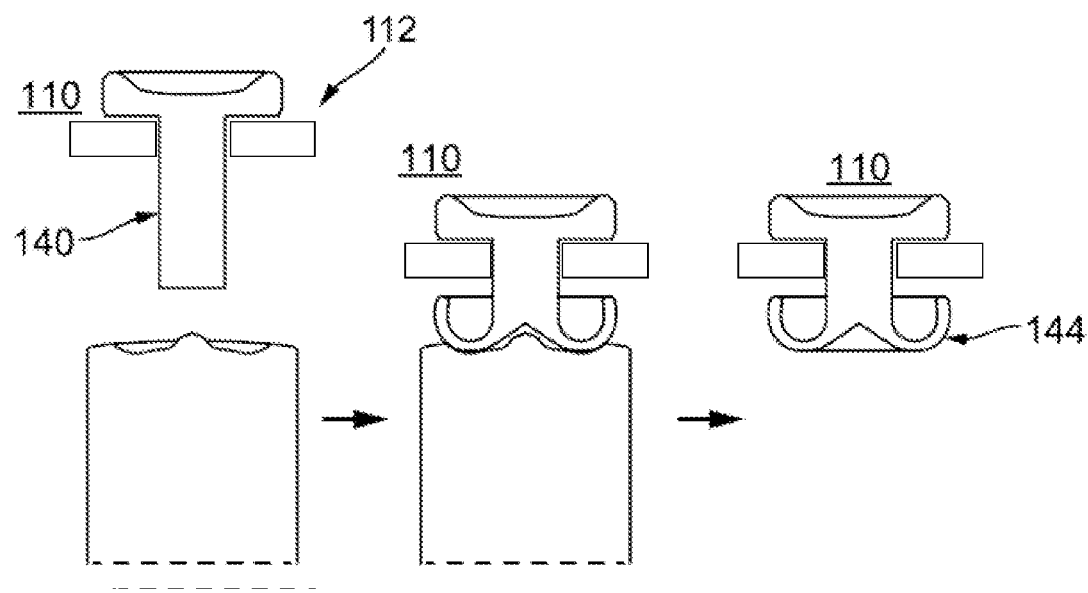
FIG. 4D

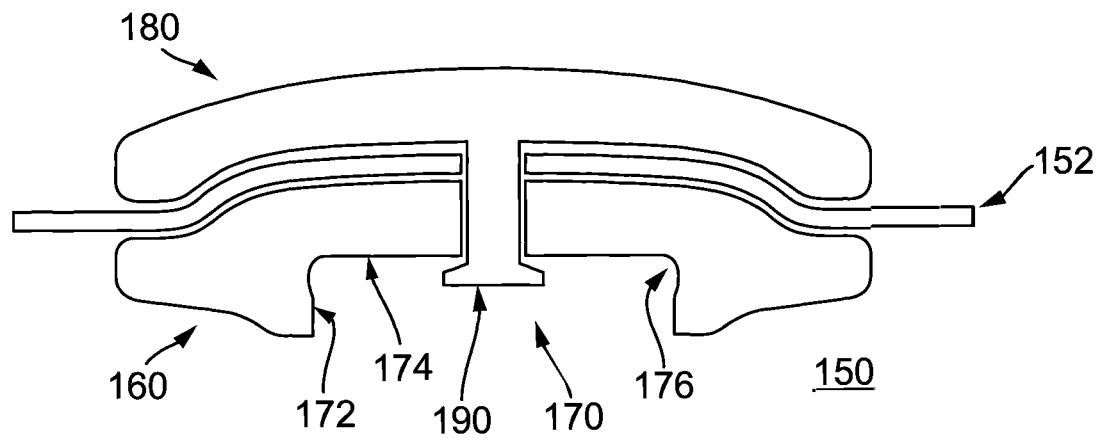
FIG. 5A
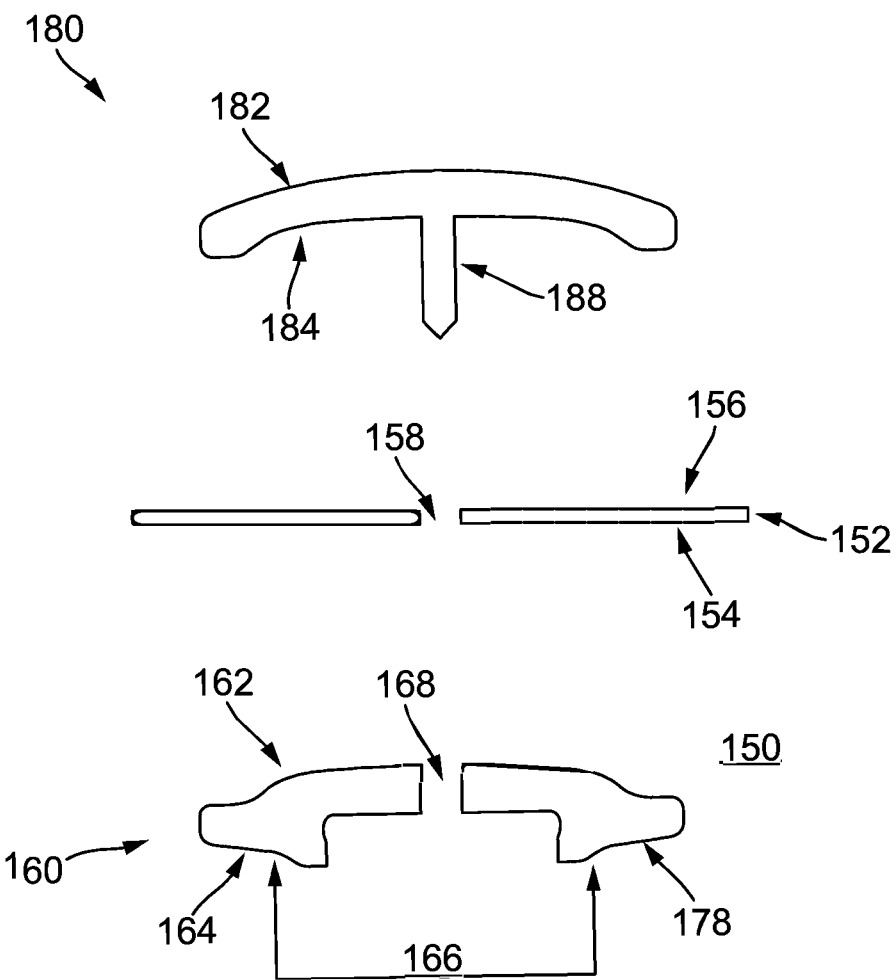
FIG. 5B

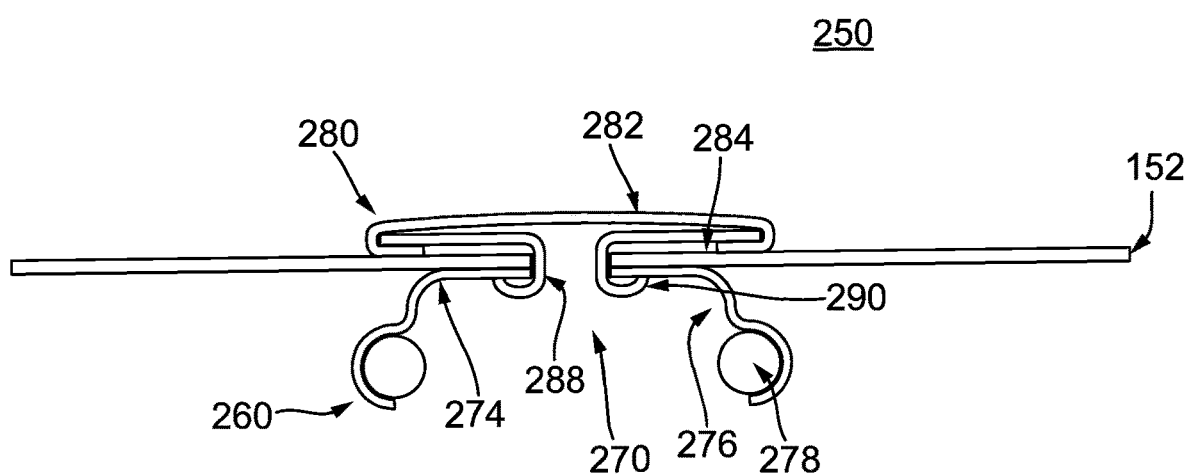
FIG. 5C

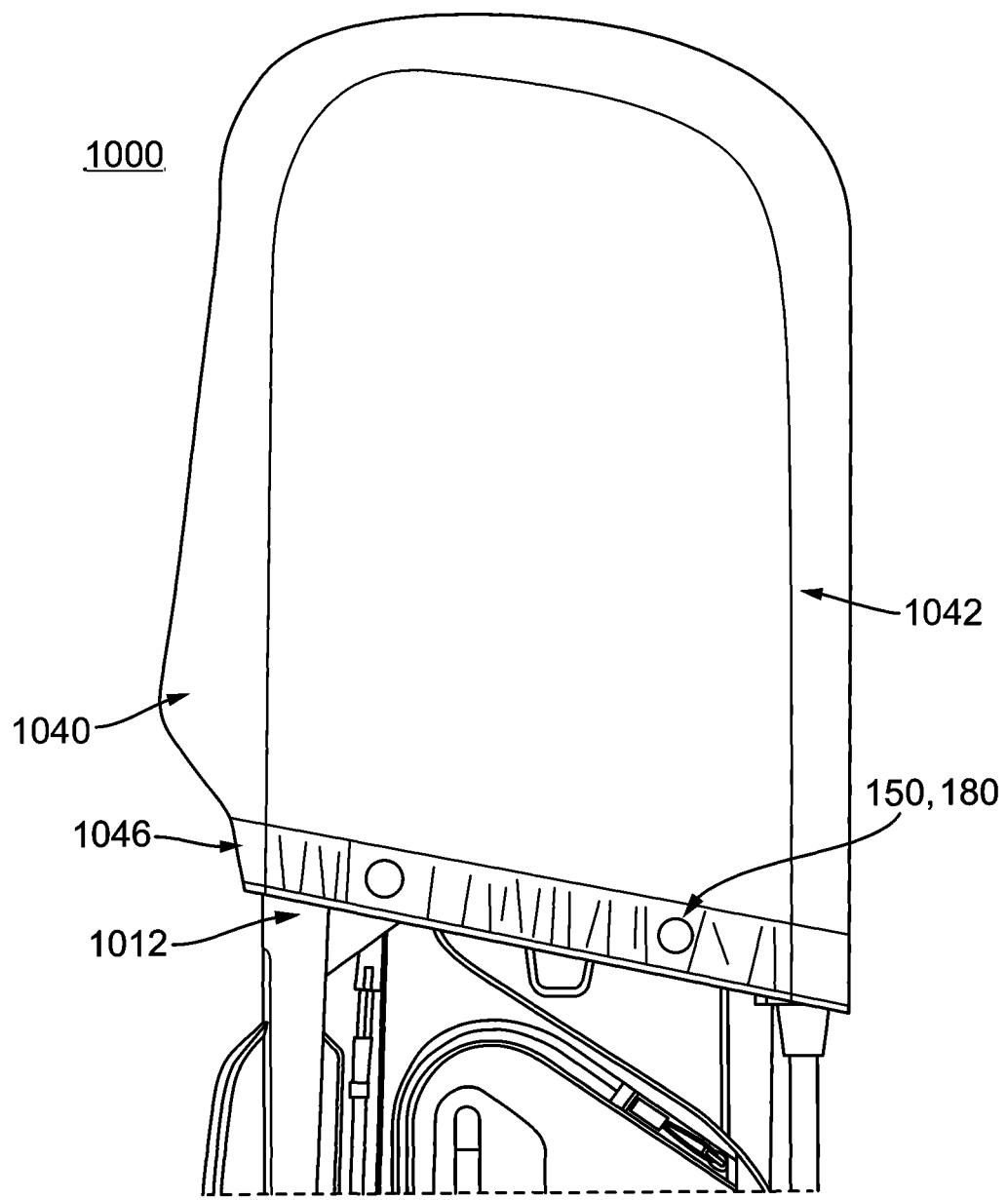
FIG. 6

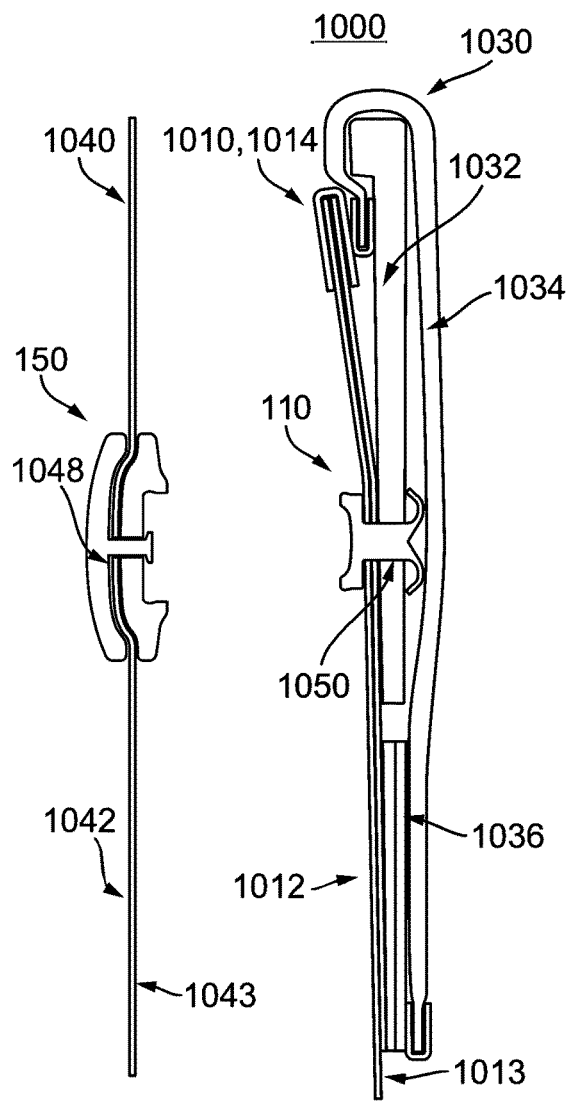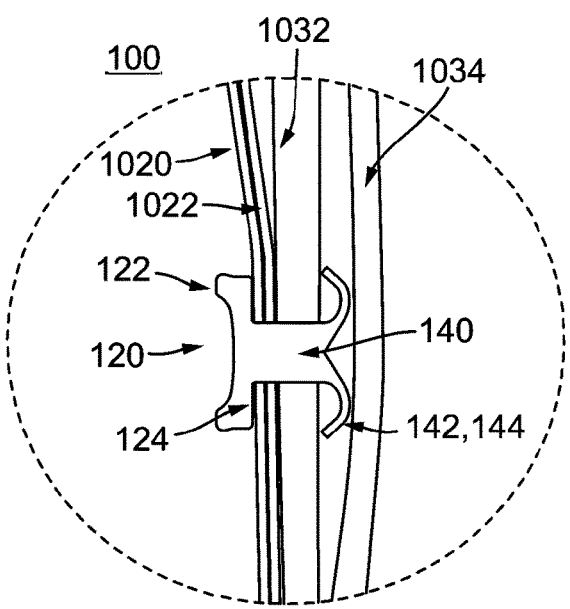
FIG. 7A
FIG. 7B

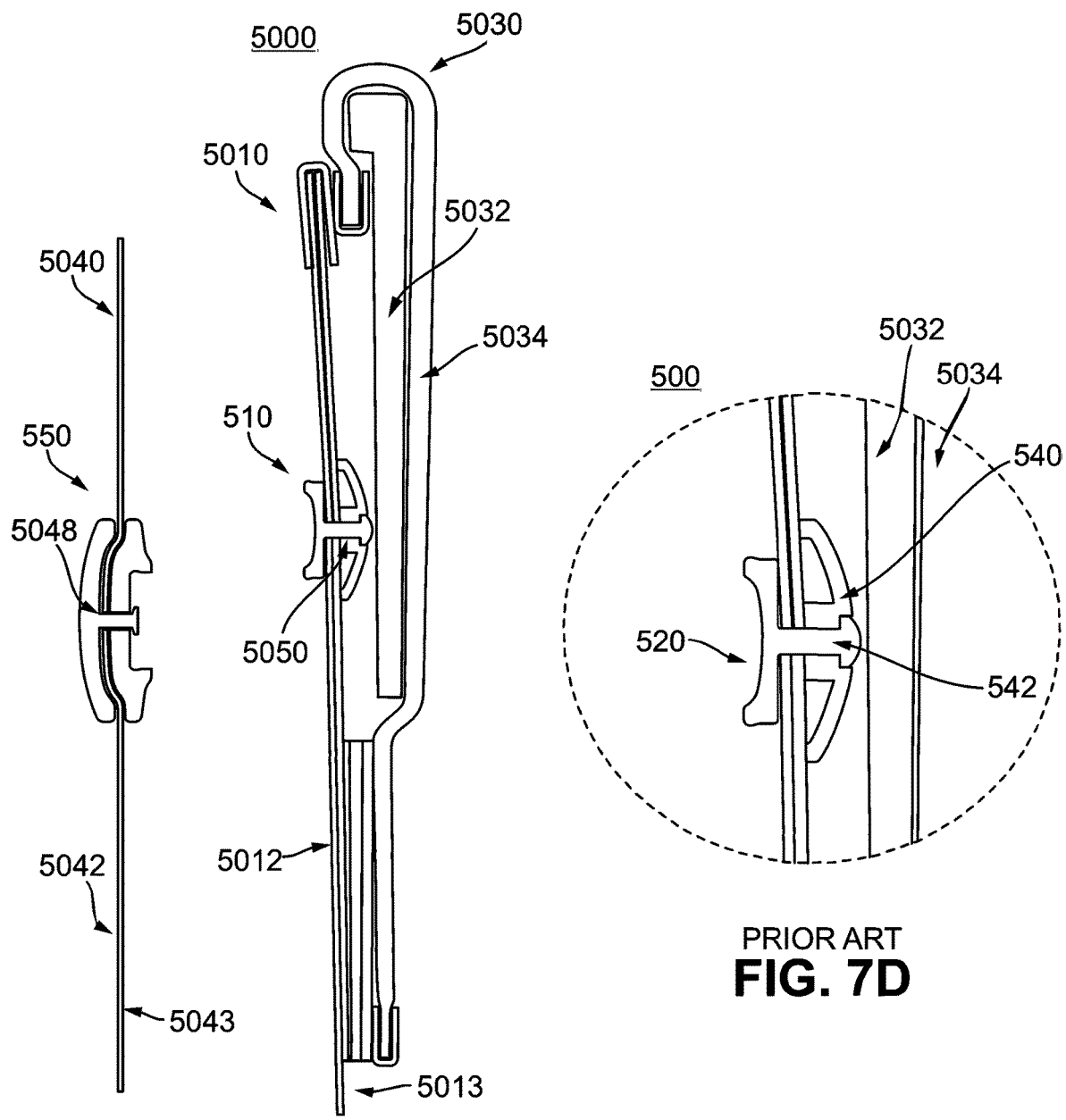
PRIOR ART
FIG. 7D
PRIOR ART
FIG. 7C

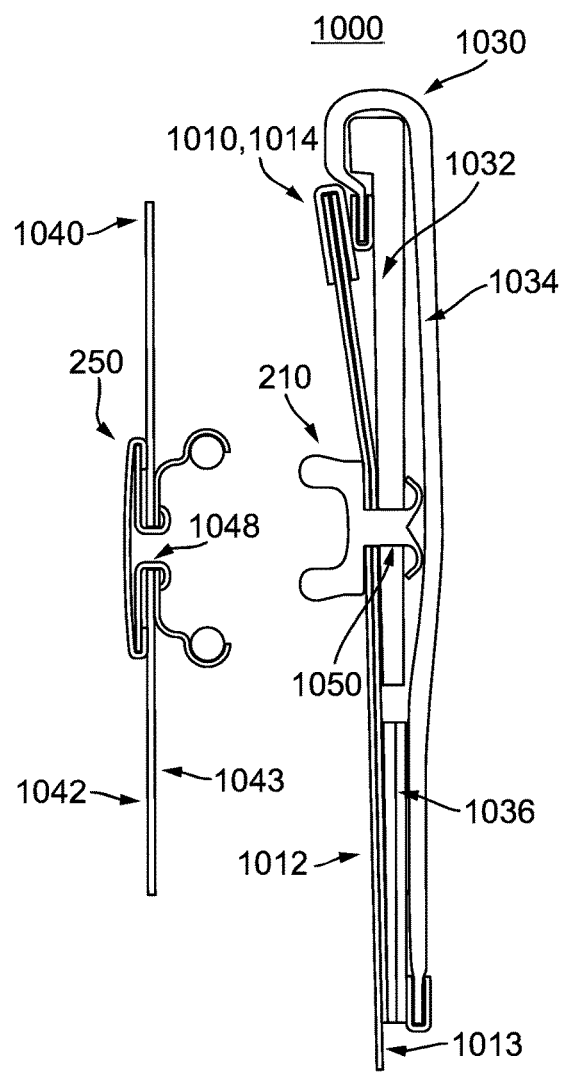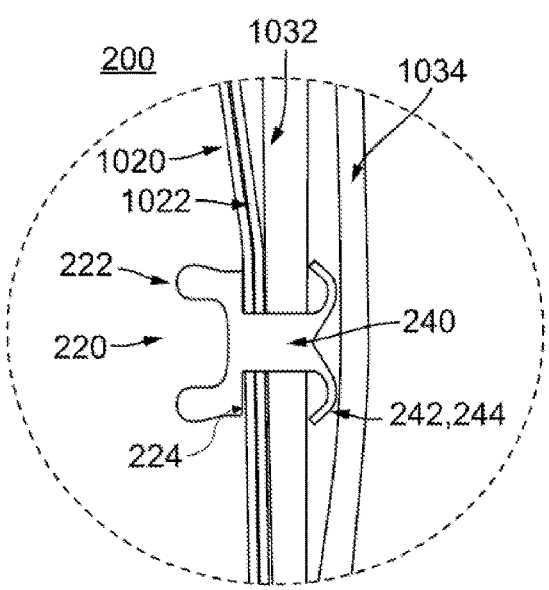
FIG. 8A
FIG. 8B

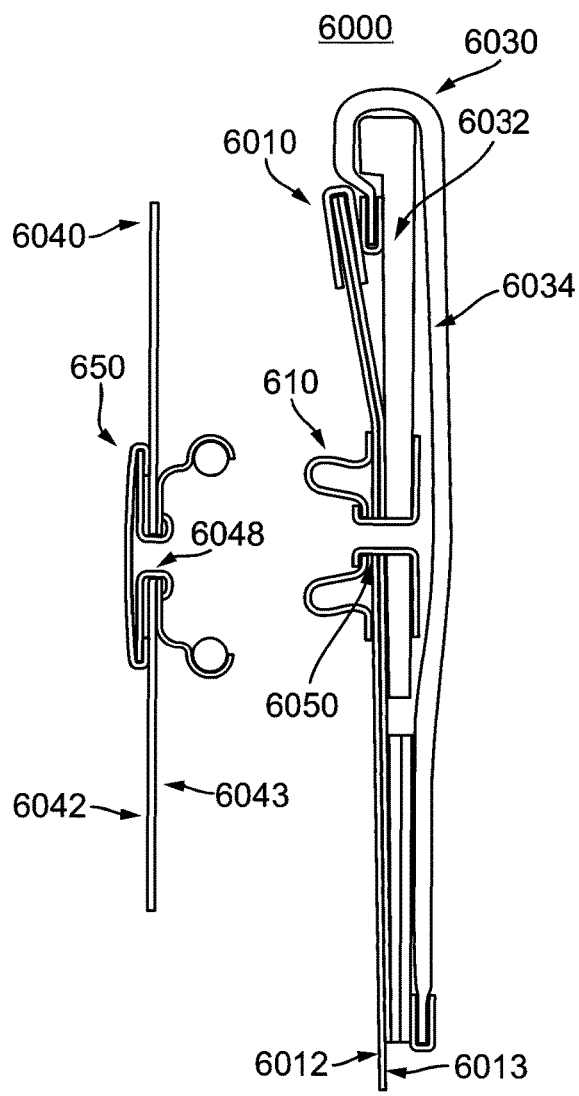
PRIOR ART
FIG. 8C
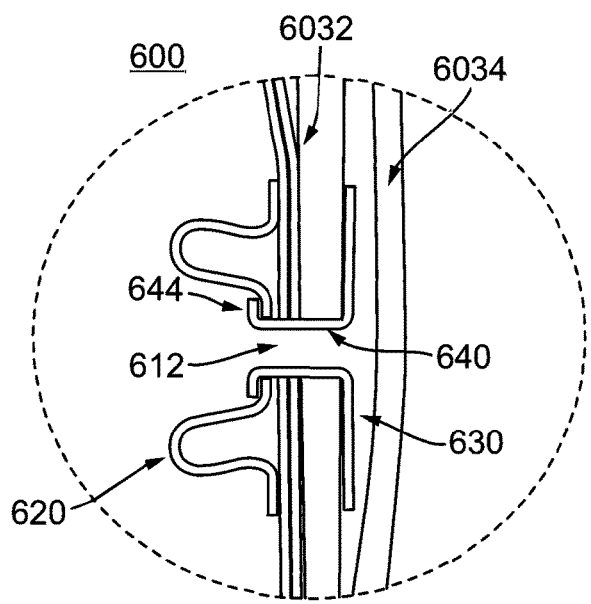
PRIOR ART
FIG. 8D

SNAP SYSTEM COMPRISING MATING RIVET

CROSS REFERENCE PRIORITIES

This is a continuation of U.S. patent application Ser. No. 17/519,482, filed Nov. 4, 2021, which claims the benefit of U.S. Provisional Application No. 63/109,779, filed Nov. 4, 2020, the contents of which are fully incorporated herein by reference.

FIELD OF THE INVENTION

The present disclosure relates to a rivet and more specifically to a rivet including an attachment means to mate with a snap.

BACKGROUND

A snap system is used to secure removable components to a material. Typically, a snap system comprises a snap that is secured to a removable component and an attachment point that is secured to the material. The snap and the attachment point are configured to mate to attach the removable component to the material. Most traditional attachment points do not provide any structural support to the material. For example, some traditional snap systems comprise a traditional attachment point having a pin, where the traditional attachment point is secured to a base via the pin. The traditional attachment point, and base are not durable components and do not provide structural support to the material. Instead, most traditional attachment points simply provide a means to attach removable components. Typically, a traditional rivet is used in combination with the snap system to provide support to the material. Certain applications require both a traditional rivet to secure the material and a traditional attachment point to secure a removable component. The combination of both a traditional rivet and a traditional attachment point introduces multiple components placed in proximity, which can create a cluttered appearance on the material.

Further, most attachment points cannot be used on a material having a variable thickness as the pin is sized for a particular thickness. The location of the attachment point is limited to a portion of the material with a specific thickness that corresponds to the pin size. If the material is too thick, the attachment point cannot be attached to the base, and if the material is too thin, the attachment point will be loose on the material.

Most snap systems and traditional rivets each provide only a single function to the material. Most attachment points are only capable of receiving a snap, and most traditional rivets are only capable of securing a material. Therefore, there is a need in the art for a multi-functional rivet that provides a structural component to an attachment point.

BRIEF DESCRIPTION OF THE DRAWINGS

FIG. 1A illustrates a cross-sectional view of a snap system, comprising a snap, a mating rivet, a first material, and a second material.

FIG. 1B illustrates an exploded view of the snap system of FIG. 1A.

FIG. 2A illustrates a cross-sectional view of the mating rivet as applied to a first material.

FIG. 2B illustrates a top perspective view of a mating rivet.

FIG. 2C illustrates a bottom perspective view of a mating rivet.

FIG. 2D illustrates a cross-sectional view of a mating rivet.

FIG. 2E illustrates an enlarged view of the mating rivet of FIG. 2D.

FIG. 3A illustrates a top perspective view of an alternative embodiment of a mating rivet.

FIG. 3B illustrates a bottom perspective view of an alternative embodiment of a mating rivet.

FIG. 3C illustrates a cross-sectional view of an alternative embodiment of a mating rivet.

FIG. 3D illustrates a close-up view of a snap system comprising a mating rivet head and a socket comprising interlocking features.

FIG. 4A illustrates a cross-sectional view of an installed mating rivet.

FIG. 4B illustrates a bottom view of an installed mating rivet comprising shank sections.

FIG. 4C illustrates a perspective view of an apparatus used to install a rivet.

FIG. 4D illustrates a cross-sectional view of a rivet throughout installation.

FIG. 5A illustrates a cross-sectional view of a snap comprising a cap, a socket and a second material.

FIG. 5B illustrates an exploded view of the snap of FIG. 5A.

FIG. 5C illustrates a cross-sectional view of a snap comprising a cap, a socket and a second material.

FIG. 6 illustrates a side view of a golf bag comprising a rain hood attached via a snap system, according to one embodiment.

FIG. 7A illustrates a cross-sectional view of a golf bag comprising a mating rivet.

FIG. 7B illustrates a close-up view of FIG. 7A.

FIG. 7C illustrates a cross-sectional view of a golf bag comprising a traditional snap system.

FIG. 7D illustrates a close-up view of FIG. 7C.

FIG. 8A illustrates a cross-sectional view of a golf bag comprising a mating rivet.

FIG. 8B illustrates a close-up view of FIG. 8A.

FIG. 8C illustrates a cross-sectional view of a golf bag comprising a traditional snap system.

FIG. 8D illustrates a close-up view of FIG. 8C.

The disclosure described herein is a snap system comprising a mating rivet and a snap component. The mating rivet has multiple functions because the mating rivet consolidates a traditional rivet with a traditional attachment point that mates with the snap component. Specifically, the mating rivet comprises a shank that permanently secures one or more layers of the material together and further comprises a head that provides an attachment point for the snap component. The snap component removably attaches a component to the mating rivet. For example, the mating rivet can secure multiple layers of a bag flat together, and the snap component can removably secure a rain hood to the bag flat via the mating rivet. The mating rivet reduces the number of parts required to secure a material and provide an attachment point for a snap. Further, the head and the shank of the mating rivet are formed integrally, which provides a stronger attachment point for the snap in comparison to a traditional snap system.

The snap system described herein has many applications, as the mating rivet and the snap can be applied to a variety of materials. The mating rivet is adjustable to varying material thickness. Specifically, the shank end splits into sections when impacted, and the sections self-adjust depending on the thickness of the material. Some applications of the snap system can include, but are not limited to, golf bags, sports bags, backpacks, tents, vehicle accessories, and tarps.

Definitions

Unless otherwise defined, all technical and scientific terms used herein have the same meaning as commonly understood by one of ordinary skill in the art. In case of conflict, the present document, including definitions, will control. Preferred methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "has," "can," and variants thereof, as used herein are intended to be open-ended transitional phrases, terms or words that do not preclude the possibility of additional acts or structures. The singular forms "a," "and," and "the" include plural references unless the context clearly dictates otherwise. The present disclosure also contemplates other embodiments "comprising," "consisting of," and "consisting essentially of" the embodiments or elements presented herein, whether explicitly set forth or not.

The term "approximately" as used hereinafter in the disclosure below is used in connection with a quantity is inclusive of the stated value and has the meaning dictated by the context (for example, it includes at least the degree of error associated with the measurement of the particular quantity). The modifier "approximately" should also be considered as disclosing the range defined by the absolute values of the two endpoints. For example, the expression "from approximately 2 to approximately 4" also discloses the range "from 2 to 4." The term "approximately" may refer to plus or minus 10% of the indicated number. For example, "approximately 10%" may indicate a range of 9% to 11%, and "approximately 1" may mean from 0.9-1.1. Other meanings of "approximately" may be apparent from the context.

The terms "first," "second," as used hereinafter in the disclosure below is used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The term "inner," "outer," "interior," "exterior" "top," "upper," "bottom," and "lower" and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein "Attachment point" as described herein is a component of a snap system that mates with a snap. An attachment point can define a male component or a female component of the snap system. An attachment point is secured to a material and mates with a snap to attach removable components to the material.

"Structural component" as described herein can be a mechanical fastener that is capable of securing a material. Structural components can include rivets, bolts, screws, or any other sturdy mechanical fastener.

"Traditional rivet" as described herein is a structural component used to secure a material. A traditional rivet comprises a head and a shank extending from the head. A traditional rivet is a purely structural component meaning the head does not include an attachment point that mates with a snap. Instead, a traditional rivet head is flat. In some traditional rivets, the shank secures an attachment point. In these rivets, the attachment point is not formed integrally with the traditional rivet.

"Traditional snap system" as described herein can be a snap system comprising at least an attachment point and a snap that mates with the attachment point. In a first exemplary traditional snap system, the attachment point comprises a head having a pin that extends through a material and is received by a base. In the first exemplary traditional snap system, the attachment point, pin, and socket are not structural components. Further, the attachment point is formed from a polymeric material. In a second exemplary traditional snap system, the attachment point comprises a head and a base having a shank, where the shank is received through an aperture defined by the head. The head and base are not formed integrally.

"First material" as described herein can be a material secured by a mating rivet. The first material is captured between the head and the tail end or shank sections of a mating rivet. The first material comprises one or more layers. The one or more layers define apertures that align to receive the mating rivet shank. The one or more layers of the first material can be a cloth material, metallic material, polymeric material, or any combination thereof. The one or more layers can comprise the same material, or different materials. The one or more layers can each comprise the same thickness, or different thicknesses. The one or more layers can be 1 layer, 2 layers, 3 layers, 4 layers, 5 layers, 6 layers, 7 layers, 8 layers, 9 layers, or 10 or more layers. The thickness of the first material is between 2.0 mm to 16.0 mm. In some embodiments, the thickness of the first material is between 2.0 mm to 3.0 mm, 3.0 mm to 4.0 mm, 4.0 mm to 5.0 mm, 5.0 mm to 6.0 mm, 6.0 mm to 7.0 mm, 7.0 mm to 8.0 mm, 8.0 mm to 9.0 mm, 9.0 mm to 10.0 mm, 10.0 mm to 11.0 mm, 11.0 mm to 12.0 mm, 12.0 mm to 13.0 mm, 13.0 mm to 14.0 mm, 14.0 mm to 15.0 mm, or 15.0 mm to 16.0 mm.

"Second material" as described herein can be a material secured by a snap. The second material is captured between the cap and the socket of the snap. The second material comprises one or more layers. The one or more layers define apertures that align to receive the post of the cap. The one or more layers of the second material can be a cloth material, metallic material, polymeric material, or any combination thereof. The one or more layers can comprise the same material, or different materials. The one or more layers can each comprise the same thickness, or different thicknesses. The one or more layers can be 1 layer, 2 layers, 3 layers, 4 layers, 5 layers, 6 layers, 7 layers, 8 layers, 9 layers, or 10 or more layers. The thickness of the second material is between 0.20 mm and 4.20 mm. In some embodiments, the thickness of the second material is between 0.20 mm to 0.70 mm, 0.70 mm to 1.20 mm, 1.20 mm to 1.70 mm, 1.70 mm to 2.70 mm, 2.70 mm to 3.20 mm, 3.20 mm to 3.70 mm, or 3.70 mm to 4.20 mm.

"Impact" as used herein refers to the action of applying force to the rivet to deform the shank tail end. A rivet is considered installed after impact.

"Snap fit connection" as used herein is any connection that is engaged via a pressing force. A snap fit connection can be secured without the use of a tool and is releasable. Typically, one component of the snap fit connection is a male component. A female component has an indentation, aperture, or housing that receives the male component. However, snap fit connections are not limited to this typical embodiment. Many elements are described with "snap fit" as an adjective, meaning that the element can be engaged with either itself or another element via a snap fit connection.

"Golf bag" as used herein is a type of storage bag for storing and transporting golf clubs. A golf bag comprises structural components including a flat, a base, and a divider top, as defined below. A golf bag further comprises removable components, such as a rain hood or a towel. The structural components and/or the removable components can be secured by means of a snap system.

"Flat" as used herein is a tubular portion, outer shell, outer housing, or cover that attaches to and extends between the divider top and the base of a golf bag. The flat can be formed from leather, synthetic leather, fabric, or other suitable materials.

"Rain Hood" as used herein is a component that is used to cover the divider top and provide a water resistance shelter for the clubs. A rain hood is detachable and comprises a water resistant fabric. A rain hood comprises a main portion that covers the golf club heads, and a lower perimeter where the rain hood is attached to the golf bag. A rain hood further comprises an interior side that faces the golf clubs, and an exterior side that is exposed to an exterior.

DETAILED DESCRIPTION

The disclosure described herein is a snap-fit system comprising a snap component and a mating component. The snap component is secured to a removable component, and has the ability to mate with the mating component. The snap component can be, but is not limited to a button, snap, or any other mating component. The mating component binds together a first material and provides a structure to attach the snap component. The mating component consolidates a structural component and an attachment point, where the attachment point mates with the snap component. The structural component is a mechanical fastener capable of securing a material different than the material of the removable component This mechanical fastener can be, but is not limited to a rivet, bolt, screw, or any mechanical fastener.

The mating component provides multiple functions to the snap system. More specifically, the first function is providing an attachment point for the snap component, and the second function is providing a structural component for the first material. The mating component has many applications as it can permanently bind together the material and allow a removable component to be attached to the material. The embodiments describe below are not limited to a combination of a structural component being a rivet and an attachment point being a female snap component.

The mating component can be a mating rivet, which consolidates a traditional rivet shank with an attachment point for the snap into one structure. The mating rivet reduces the number of parts required to permanently secure a material and removably secure another. Further, the mating rivet provides a more secure attachment point than a traditional snap system because the mating rivet is a structural component.

The mating rivet head is an attachment point for a snap and is formed integrally with the rivet shank. Therefore, the mating rivet is a multi-functional component, where the shank is a structural component that secures a first material, and the head is an attachment point for a snap. Various embodiments of the snap system are associated with the advantages described below.

Referring to FIGS. 1A and 1B, a first embodiment of the snap system 100 comprises a snap 150 and a mating rivet 110. The mating rivet 110 provides a structural component to a first material 112, and further provides an attachment point for the snap 150. The snap 150 is secured to a second material 152 and encapsulates the mating rivet head 120. The snap 150 and the mating rivet 110 provide a means to permanently secure the first material 112 and removably secure second material 152 to the first material 112.

I. Mating Rivet

The mating rivet 110 is a mechanical fastener that provides two functions to the snap system 100. Since the mating rivet 110 consolidates an attachment point with a traditional rivet, it provides structural support to the first material 112 and provides an attachment point for the snap 150. Referring to FIG. 2A, the mating rivet 110 comprises a head 120 and a shank 140. The head 120 is an attachment point that mates with the snap 150, and the shank 140 is the structural component that secures the first material 112. The head 120 is expose on the first material exterior side 116, which allows the snap 150 to mate with the head 120. The head 120 can comprise a geometry that corresponds to the geometry of the snap 150 to facilitate the removable connection between the mating rivet 110 and the snap 150. The shank 140 is aligned and positioned within an aperture 118 defined by the first material 112. The shank 140 deforms in response to an impact to compress the first material 112 between the head 120 and the shank 140. The shank 140 is exposed on the first material interior side 114 and it is not visible from the first material exterior side 116. In one exemplary application, the mating rivet 110 can be used to secure a golf bag flat. The head 120 can be exposed on an exterior side of the golf bag and can receive a removable component, and the shank 140 can be exposed on an interior side of the golf bag and secure the flat material.

a. Head with Protrusion

As discussed above, the mating rivet head 120 is exposed on the first material exterior side 116. The head 120 mates with the snap 150 to removably secure the second material 152 to the first material. FIGS. 2A-2E illustrate a first embodiment of mating rivet head 120. Referring to FIGS. 2B and 2C, the head 120 comprises an upper surface 122, a lower surface 124, and a perimeter surface 126. The upper surface 122 is proximate the snap 150. The lower surface 124 is opposite the upper surface 122, and the shank 140 extends from the lower surface 124. The head 120 is positioned such that the lower surface 124 lies flush with the first material exterior side 116, and the lower surface 124 is parallel to the first material exterior side 116. The lower surface 124 does not interact with the snap 150. The perimeter surface 126 circumscribes the head 120. The perimeter surface 126 is perpendicular to the first material exterior side 116. The upper surface 122 and the perimeter surface 126 contact the snap 150, as illustrated in FIG. 1A. Various embodiments are arranged with the geometry of the upper surface 122 and the perimeter surface 126.

The upper surface 122 and the perimeter surface 126 can comprise a geometry that corresponds to the geometry of the snap 150. The corresponding geometry facilitates the interaction between the snap 150 and the mating rivet head 120. Referring to FIG. 2D, the upper surface 122 comprises a center portion 128 and a peripheral portion 132. The center portion 128 is recessed into the head 120 toward the lower surface 124, thereby defining a recess 130. The recess 130 is bowl-shaped and convex relative to the first material 112. The recess 130 is configured to receive a portion of the snap 150, as described in better detail below. The recess 130 is configured to allow the snap 150 to easily mate with the head 120. Therefore, the recess 130 facilitates the interaction between the head 120 and the snap 150. The recess 130 is a smooth continuous surface devoid of an aperture. The recess 130 is located within the center portion 128 of the upper surface 122, such that the peripheral portion 132 circumscribes the recess 130.

Referring to FIG. 2E, the peripheral portion 132 defines a rim 134 that circumscribes the recess 130. The rim 134 is a raised portion relative to the recess 130. In some embodiments, the rim 134 is flat or parallel relative to the first material exterior side 116. In other embodiments, the rim 134 is rounded. In some embodiments, the rim 134 is a continuous uninterrupted surface. In other embodiments, the rim 134 comprises interlocking features that mate with corresponding interlocking features on the snap 150 (not shown). The rim 134 and the perimeter surface 126 contact the snap 150 and are configured to form a tight but removable connection with the snap 150.

Referring again to FIG. 2E, the perimeter surface 126 comprises a circumferential protrusion 136 (hereafter referred to as "the protrusion") that projects outwardly from the perimeter surface 126. The protrusion 136 is received within a depression 176 defined by the snap, as discussed in better detail below. As such, the protrusion 136 further facilitates the tight but removable connection with the snap 150. The protrusion 136 extends in a direction parallel to the lower surface 124. The protrusion 136 is located closer to the upper surface 122 than the lower surface 124. As such, the protrusion 136 defines a transition between the rim 134 and the perimeter surface 126. In some embodiments, the protrusion 136 is rounded, as illustrated in FIG. 2E. In other embodiments, the protrusion 136 is rectangular in a cross-sectional view, thereby defining a shelf (not shown). The geometry of the upper surface 122 and the perimeter surface 126, specifically the recess 130 and the protrusion 136 facilitate the interaction between the head 120 and the snap 150. The capability of the head 120 to interact with the snap 150 is the first function of the multi-function mating rivet 110. Various embodiments of the mating rivet 110 are associated with the capability to receive removable components.

b. Head with Curved Rim

FIGS. 3A-3C illustrate a second embodiment of the mating rivet head 220. The head 220 is similar to the head 120 and is described using similar reference numbers to head 120. For example, the head 220 comprises an upper surface 222 and a perimeter surface 226, which are similar to the upper surface 122 and the lower surface 126 of head 120. The head 220 is associated with a shank 240, which is similar to shank 140 of the mating rivet 110. The head 220 is further associated with a snap 250, which is configured to mate with the head 220. The main difference in the head 220, in comparison to the head 120, is the geometry of the rim 234. Referring to FIG. 3C, the rim 234 is rounded and creates a smooth transition to the perimeter surface 226. Further, the head 220 comprises a greater thickness than the thickness of the head 120. The increased thickness of the head 220 can provide a strong attachment point. Further, the increased thickness provides a deeper recess 230, which can allow the head 220 to mate with various embodiment of the snap.

c. Head with Interlocking Features

FIG. 3D illustrates a third embodiment of the snap system 300 comprising a mating rivet 310 and a snap 350. The mating rivet 310 is similar to the mating rivet 110 and is described using similar reference numbers to the mating rivet 110. For example, the mating rivet 310 comprises a head 320 and a shank 340, which are similar to the head 120 and a shank 140 of the mating rivet 110. Further, the snap 350 is similar to the snap 150 and is described using similar reference numbers to the snap 150. For example, the snap comprises a cap 380 and a socket 360 similar to the cap 180 and the socket 160 of the snap 150. The snap system 300 is similar to the snap system 100, except for the addition of interlocking features.

The snap system 300 further comprises interlocking features positioned on the head 320 of the mating rivet 310 that correspond to interlocking features positioned on the socket 360 of the snap 350. The interlocking features can provide torsional resistance to the snap system 300, while still allowing the snap 350 to removably mate with the mating rivet 310. The interlocking features can be one or more projections, teeth, recesses, threads, or any other interlocking feature. The interlocking features described herein can further lock the head 320 into the cavity 370 of the socket 360.

The head 320 comprises a first interlocking feature located near the upper surface 322. The first interlocking feature mates with a second interlocking feature, which is located on the socket 360. In some embodiments, the first interlocking feature can protrude from the head upper surface 322, and the second interlocking feature can be configured to receive the first interlocking feature. Referring to FIG. 3D, the first interlocking feature can be a plurality of teeth 394 that project from the rim 334 of the head 320. The second interlocking feature can be a plurality of recesses 396 that are recessed into the cavity floor 374 of the socket 360. The cavity 370 can receive the head 320 such that the plurality of recesses 396 receive the plurality of teeth 394. The connection between the head 320 and the socket 360 can be secure for the reasons discussed above, and the interlocking features can further provide torsional resistance to the snap system 300.

Various embodiments of the snap system described herein can be associated with interlocking features and are not limited to a head comprising a plurality of teeth and a socket comprising a plurality of corresponding recesses. The reinforcement provided by the interlocking features can be useful in certain applications where twisting between the head 320 and the snap 350 is undesirable. Some applications of the snap system 300 comprising interlocking features can include but are not limited to snaps systems applied to removably attachable golf bag accessories, tents, vehicle accessories, and tarps. The interlocking features can comprise any compatible geometry that prevents undesired twisting while still allowing a removable connection between the head 320 and the socket 360.

The head can be configured to be received within and encapsulated by the snap. Therefore, the geometry and dimensions of the head can be selected to correspond to the geometry and dimensions of the snap. The dimensions discussed below can be applied to the various embodiments of the head 120, 220, 320 described herein.

The head comprises an outer diameter and a thickness, for receiving corresponding dimensions of the snap cavity. The outer diameter is measured from the furthest extent of the perimeter surface. The outer diameter can vary in a direction from the upper surface to the lower surface to accommodate various embodiments of a snap. The maximum outer diameter can be near the upper surface or near the protrusion, and the minimum outer diameter can be near the lower surface.

The outer diameter is between 5.0 mm to 10.0 mm. In some embodiments, the outer diameter is between 5.0 mm to 7.0 mm, 5.0 mm to 8.0 mm, 6.0 mm to 8.0 mm, 7.0 mm to 9.0 mm, or 9.0 mm to 10.0 mm. In some embodiments, the outer diameter is approximately 5.0 mm, 5.5 mm, 6.0 mm, 6.5 mm, 7.0 mm, 7.5 mm, 8.0 mm, 8.5 mm, 9.0 mm, 9.5 mm, or 10.0 mm. In one exemplary embodiment, the outer diameter can be 7.5 mm near the lower surface and 7.8 mm near the protrusion. In another exemplary embodiment, the outer diameter can be 9.6 mm near the lower surface and 10.0 mm near the upper surface.

The thickness of the head is measured from the upper surface to the lower surface. The thickness can vary throughout the head from the rim towards the center portion of the head. The minimum thickness can be near the center portion or the recess, and the maximum thickness can be near the perimeter surface or the rim. The thickness can be optimized to create a non-obtrusive head that is still thick enough to provide a sufficient attachment point for the snap. The thickness can be selected to create a low-profile head that is less-likely to be snagged or damaged.

The thickness is between 1.00 mm and 5.00 mm. In some embodiments, the thickness is between 1.00 mm to 1.50 mm, 1.50 mm to 2.00 mm, 2.00 mm to 3.50 mm, 3.50 mm to 4.00 mm, 4.00 mm to 4.50 mm, or 4.50 mm to 5.00 mm. In some embodiments, the thickness is approximately 1.00 mm, 1.50 mm, 2.00 mm, 2.50 mm, 3.00 mm, 3.50 mm, 4.00 mm, 4.50 mm, or 5.00 mm. In one exemplary embodiment, the thickness can be 1.25 mm near the recess and 2.25 mm near the rim. In another exemplary embodiment, the thickness can be 1.25 mm near the recess and 4.50 mm near the rim.

The head further comprises a recess diameter and a recess depth. These dimensions can be selected to accommodate various embodiments of a snap. For example, in some snap systems, a portion of the snap can be received within the recess. While the snap encapsulates the head, a portion of the snap can rest within the recess, as discussed in better detail below. The recess dimensions can further facilitate the interaction between the snap and the mating rivet head.

The recess diameter is measured across the recess from the furthest extent of the rim. The recess diameter is between 2.0 mm and 10.0 mm. In some embodiments, the recess diameter is between 2.0 mm to 5.0 mm, 3.0 mm to 4.0 mm, 3.0 mm to 6.0 mm, 4.0 mm to 6.0 mm, 5.0 mm to 7.0 mm, 6.0 mm to 8.0 mm, 6.0 mm to 9.0 mm, or 7.0 mm to 10.0 mm. In some embodiments, the recess diameter is approximately 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, or 10.0 mm. In one exemplary embodiment, the recess diameter can be 4.0 mm. In another exemplary embodiment, the recess diameter can be 6.4 mm.

The recess depth is measured from the rim to the bottom of the recess. The recess depth is between 0.50 mm and 4.50 mm. In some embodiments, the recess depth is between 0.50 mm to 1.00 mm, 1.00 mm to 1.50 mm, 2.00 mm to 3.50 mm, or 3.00 mm to 4.50 mm. In some embodiments, the recess depth is approximately 0.50 mm, 1.00 mm, 1.50 mm, 2.00 mm, 2.50 mm, 3.00 mm, 3.50 mm, 4.00 mm, or 4.50 mm. In one exemplary embodiment, the recess depth can be 1.00 mm. In another exemplary embodiment, the recess depth can be 3.25 mm.

As discussed above, the head is the attachment point for the snap. Therefore, various embodiments of the mating rivet head described herein can be associated with dimensions compatible to the dimensions of a corresponding snap. Specifically, the geometry and dimensions of the head can be selected to allow the head to be received within the snap.

The mating rivet described herein is a multi-functional rivet. The head provides the first function to the mating rivet by providing an attachment point for the snap. The shank provides the second function by providing a structural component for securing the first material. Forming the head integrally with the shank, provides a sturdy attachment point because the head is integral with a structural component.

The head is exposed on the exterior side of the first material and is preferably waterproof to prevent damage to the interior side of the first material. Therefore, various embodiments of the disclosure can be associated waterproof head features. For example, the head upper surface and perimeter surface can be continuous surfaces that are devoid of apertures. Further, the head lower surface can be flush with the exterior side of the first material. The tight fit between the head and the first material, and the lack of apertures can create a waterproof head. The tight fit between the head and the first material is facilitated by the shank, which self-adjusts during installation to the thickness of the material.

d. Shank

As discussed above, the shank 140 provides the second function to the mating rivet 110 by providing a structural component that secures the first material 112. More specifically, the shank 140 is aligned and positioned within an aperture 118 of the first material 112, and the shank 140 bends in response to an impact to compress the first material 112 between the head 120 and the shank 140. The head 120 is exposed on the first material exterior side 116, and the shank 140 is exposed on the first material interior side 114.

Referring to FIG. 4A, the shank 140 extends from the head lower surface 124. The shank 140 comprises a hollow cylinder having a tail end 142. The tail end 142 is located opposite the head 120. In some embodiments, the shank 140 is positioned within a premade aperture of the first material 112. However, the shank 140 is strong enough to puncture through the first material 112 upon impact and does not require a premade aperture. The shank 140 extends through the first material 112 from the exterior side 116 to the interior side 114, and the tail end 142 extends beyond the first material 112. The entire shank 140 extends perpendicularly through the aperture 118, as illustrated in FIG. 2A. The tail end 142 deforms in response to an impact during installation and splits into one or more shank sections 144.

FIG. 4C illustrates the apparatus used to install the mating rivet 110 to the first material 112. The apparatus includes a press and an anvil, where the anvil includes a surface having an imprinted shape. The imprinted shape corresponds to the desired geometry of the deformed shank 140.

FIG. 4D illustrates the mating rivet 110 throughout installation. Prior to installation, the shank 140 extends perpendicularly through the aperture 118 of the first material 112. During installation, the press applies a downward force to the head 120 until the shank 140 impacts the imprinted surface. The impact and the imprinted surface force the shank 140 to deform according to the imprinted shape of the anvil. In some embodiments, the imprinted shape splits the tail end 142 into one or more equal shank sections 144. In one embodiment, the tail end 142 splits into six equal shank sections.

FIG. 4B illustrates the shank sections 144 from the first material interior side 114. Each shank section 144 bends back toward the head lower surface 124. The shank sections 144 pinch the first material interior side 114. The shank sections 144 tightly secure the first material 112 by applying a force a direction towards the rivet head 120.

Various embodiments of the disclosure can be associated with the ability to use the mating rivet at different locations on the first material, where the different locations have different thicknesses. More specifically, the shank sections can split and bend at different lengths based on the thickness of the first material. In some traditional snap systems, the attachment point pin comprises a fixed length, and the pin snaps into the base at a fixed location. Therefore, the locations of the attachment point of the traditional snap system are limited.

Various embodiments of the disclosure can be associated with the shank sections, which are a non-obtrusive feature relative to the first material. In other words, the shank sections do not protrude from the first material, but instead, lie flush with the interior side of the first material. The flush shank sections can be covered to be hidden from visibility. Various embodiments of the disclosure can be associated with the shank sections, which are positioned near the first material interior side and do not secure an attachment point. Some traditional snap systems, comprise a separate attachment point that is held by the shank sections. In this type of traditional snap system, the shank sections are formed on the exterior side of the first material. The shank sections of the mating rivet, however, are exposed on the interior side. The shank sections of the traditional snap system cannot be hidden from visibility on the exterior side of the first material.

The shank can be configured to be received within an aperture defined by the first material and to provide support to the first material. Further, the shank can be configured to provide support to the mating rivet head. The dimensions discussed below can be applied to the various embodiments of the shank as described herein.

The shank comprises a length and a diameter. The length of the shank can be selected to ensure the shank sections are long enough to provide substantial support to the first material. Further, the diameter of the shank can be selected to ensure the shank provides substantial support to the mating rivet head and can be received within the first material aperture.

The length is measured along the shank from the tail end to the end near the mating rivet head. The length is between 8.0 mm and 20.0 mm. In some embodiments, the length is between 8 mm to 12 mm, 8 mm to 15 mm, 12 mm to 15 mm, 12 mm to 18 mm, 13 mm to 15 mm, 14 mm to 16 mm, 14 mm to 17 mm, 15 mm to 18 mm, 16 mm to 19 mm, or 16 mm to 20. In some embodiments the length is approximately 8.0 mm, 8.5 mm, 9.0 mm, 9.5 mm, 10.0 mm, 10.5 mm, 11.0 mm, 11.5 mm, 12.0 mm, 12.5 mm, 13.0 mm, 13.5 mm, 14.0 mm, 14.5 mm, 15.0 mm, 15.5 mm, 16.0 mm, 16.5 mm, 17.0 mm, 17.5 mm, 18.0 mm, 18.5 mm, 19.0 mm, 19.5 mm, or 20.0 mm. In one embodiment, the length of the shank can be 10.0 mm.

The diameter is measured across the shank in a direction perpendicular to the shank length. The diameter is between 2.0 mm and 10.0 mm. In some embodiments, the diameter is between 2.0 mm to 5.0 mm, 3.0 mm to 5.0 mm, 4.0 mm to 7.0 mm, 5.0 mm to 8.0 mm, 6.0 mm to 9.0 mm, 7.0 mm to 9.0 mm, or 8.0 mm to 10.0 mm. In some embodiments, the diameter is approximately 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, or 10.0 mm. Various embodiments of the shank are associated with the aforementioned dimensions. The dimensions of the shank can be selected to ensure the shank provides substantial support to the head and the first material.

As discussed above, the head and the shank are formed integrally, which forms a secure structural component and attachment point for the snap. The head and the shank are formed from a single material. In some embodiments, the mating rivet is formed from a metallic material. For example, the mating rivet can be formed from a titanium alloy or a steel alloy. Forming the mating rivet from a steel alloy allows the mating rivet to maintain the desirable characteristics of a traditional all-steel rivet. For example, traditional all-steel rivets are strong, durable, and resistant to vibrations. In some traditional snap systems, the attachment point, and base are formed from a polymeric material. In such traditional snap systems, the attachment point, and base are not strong enough to be used as structural components. The mating rivet described herein provides a structural component to the first material in addition to providing an attachment point for the snap.

The snap system 100 further comprises a snap 150, which is associated with a second material 152. The snap system 100 provides a removable connection between the first material 112 and the second material 152 via the mating rivet 110 and the snap 150. As discussed above, the mating rivet 110 provides a structural component to the first material 112 and provides an attachment point for the snap 150. The snap 150 is configured to removably secure a second material 152 and to receive the mating rivet head 120 to secure the snap system 100.

II. Snap

FIGS. 5A and 5B illustrate one embodiment of the snap 150. As discussed above, the snap 150 is the second component of the snap system 100, which is associated with a second removable material 152. The snap 150 comprises a cap 180 and a socket 160, where the socket 160 is located on the second material interior side 154, and the cap 180 is located on the second material exterior side 156. The socket 160 receives the cap 180, and the second material 152 is secured therebetween. The socket 160 further receives the mating rivet head 120 such that the second material interior side 154 contacts the first material exterior side 116. The cap 180 is positioned further away from the mating rivet 110 and is the only visible component of the snap system 100 from the exterior. In one exemplary application, the mating rivet 110 can be used to secure a golf bag flat and the snap 150 can be secured to the rain hood. The mating rivet head 120 can be exposed on an exterior side of the golf bag, and the snap 150 can receive the mating rivet head 120 to secure the rain hood to the golf bag. The cap 180 can be the outermost component of the snap system 100.

a. Cap

Referring to FIG. 5B, the cap 180 comprises a top surface 182 and a bottom surface 184. The cap top surface 182 is visible from the second material exterior side 156. The cap top surface 182 is the only visible portion of the assembled snap system 100. The cap top surface 182 is a smooth uninterrupted surface that is devoid of an aperture or a recess. The cap top surface 182 and cap bottom surface 184 are concave relative to the second material 152. The cap bottom surface 184 is proximate the mating rivet head 120 and contacts the second material exterior side 156.

The cap 180 further comprises a post 188 that extends towards the socket 160 from the cap bottom surface 184. The post 188 is received through the second material aperture 158 and further received by a socket aperture 168. FIG. 5A illustrates the cap 180 as received by the socket 160, where a distal end of the post 188 deforms in response to an impact, thereby defining a stud 190. The stud 190 comprises a diameter larger than the diameter of the socket aperture 168, which secures the cap 180 to the socket 160. The increased diameter of the stud 190 anchors the cap 180 to the socket 160, which ensures the socket 160 and cap 180 bind and affix to each other as the snap 150 engages and disengages the mating rivet head 120. The stud 190 further helps to pinch the second material 152 between the cap 180 and the socket 160. Referring to FIG. 1A, the stud 190 can be positioned within the mating rivet head recess 130. In some embodiments, the stud 190 can comprise one or more prongs that can engage with one or more teeth that are positioned within the mating rivet head recess 130 (not shown). The cap 180 is received within the socket 160, and the second material 152 is pinched therebetween. The cap 180 is the portion of the snap 150 that is exposed on the second material exterior side 154.

b. Socket

The socket 160 is the portion of the snap 150 that receives the mating rivet head. The socket 160 comprises a top surface 162 and a bottom surface 164. The socket top surface 162 is proximate the cap 180 and contacts the second material 152. The second material 152 is secured between the cap bottom surface 184 and the socket top surface 162. The socket bottom surface 164 is proximate the mating rivet head 120.

The socket 160 further comprises a central portion 166 and a perimeter portion 178. Referring to FIGS. 5A and 5B, the central portion 166 defines a cavity 170 that is recessed away from the socket bottom surface 164 into the socket 160 via a cavity wall 172 and a cavity floor 174. Further, the cavity 170 defines a depression 176, where a portion of the cavity wall 172 is further recessed into the socket 160. The depression 176 is near the cavity floor 174. The cavity 170 receives and encapsulates the mating rivet head 120 to secure the snap 150 to the mating rivet 110.

The cavity 170 comprises a geometry that is compatible with the mating rivet head 120 geometry to create a tight connection between the snap 150 and the mating rivet 110. Referring to FIG. 1A, the cavity 170 receives the head 120 such that the cavity floor 174 contacts the mating rivet head rim 134, and the cavity wall 172 contacts the perimeter surface 126 of the mating rivet head 120. Further, the depression 176 receives the mating rivet head protrusion 136. The snap 150 encapsulates the head 120 such that the stud 190 sits within the recess 130. The stud 190 is required to anchor the cap 180 to the socket 160, and the recess 130 is required to provide space for the stud 190. Therefore, the recess 130 and the corresponding geometries of the cavity 170 and the head 120 facilitate the releasable connection between the mating rivet 110 and the snap 150.

Various embodiments of the cavity can be sized to facilitate the releasable connection with the mating rivet head. The cavity comprises a depth that corresponds to the thickness of the mating rivet head, and a diameter that corresponds to the diameter of the mating rivet head. The dimensions discussed below can be applied to the various embodiments of the cavity as described herein.

The depth of the cavity is measured from the socket bottom surface to the cavity floor and can also be considered as the height of the cavity walls. The depth is between 0.75 mm and 4.75 mm. In some embodiments, the depth is between 0.75 mm to 1.75 mm, 1.75 mm to 2.75 mm, 2.75 mm to 3.75 mm, or 3.75 mm to 4.75 mm. In some embodiments, the depth is approximately 0.75 mm, 1.00 mm, 1.25 mm, 1.50 mm, 1.75 mm, 2.0 mm, 2.25 mm, 2.50 mm, 2.75 mm, 3.00 mm, 3.25 mm, 3.50 mm, 3.75 mm, 4.00 mm 4.25 mm, 4.50 mm, or 4.75 mm. In one exemplary embodiment, the cavity depth can be 1.25 mm. In another exemplary embodiment, the cavity depth can be 3.25 mm.

The diameter of the cavity is measured across the cavity from the furthest extent of the cavity walls. The cavity diameter can vary from the socket top surface to the socket bottom surface. The maximum cavity diameter can be near the cavity floor or the depression, and the minimum cavity diameter can be near the socket bottom surface. The variable cavity diameter can correspond to the variable diameter of the mating rivet head. The cavity diameter is between 5.00 mm and 10.0 mm. In some embodiments, the diameter is between 5.00 mm to 7.00 mm, 6.00 mm to 9.00 mm, 7.00 mm to 10.00 mm, or 8.00 mm to 10.00 mm. In some embodiments, the depth is approximately 5.00 mm, 5.50 mm, 6.00 mm, 6.50 mm, 7.00 mm, 7.50 mm, 8.00 mm, 8.50 mm, 9.00 mm, 9.50 mm, or 10.0 mm. In one exemplary embodiment, the cavity diameter can be 8.00 mm near the cavity floor, and 7.65 mm near the bottom surface. In another exemplary embodiment, the cavity diameter can be 10.00 mm near the cavity floor, and 9.65 mm near the bottom surface.

The socket 160 is configured to removably receive the mating rivet head 120, and to permanently receive the cap 180. The central portion 166 further defines an aperture 168 that extends from the socket top surface 162 to the cavity floor 174. The aperture 168 is located at a thinned region of the socket 160 above the cavity 170. The post 188 extends from the cap 180 through the aperture 168 such that the stud 190 sits near the cavity floor 174. The diameter of the stud 190 is larger than the diameter of the aperture 168, which prevents the post 188 from releasing from the cavity. The stud 190 anchors the cap 180 to the socket 160 and ensures the cap 180 binds and affixes to the socket 160.

Referring to FIG. 1A, the stud 190 further sits within the mating rivet head recess 130 but does not contact the recess 130. Further, the mating rivet head recess 130 does not contact the cavity floor 174. The socket central portion 166 facilitates the connections between the socket 160 and the cap 180, and the socket 160 and the mating rivet head 120. In other words, the socket central portion 166 acts as a connection bridge between the mating rivet head 120 and the snap 150. The socket perimeter portion 178 facilitates the removable connection between the snap 150 and the mating rivet head 120.

The perimeter portion 178 of the socket 160 circumscribes the central portion 166. Referring to FIG. 5B, the perimeter portion 178 comprises a reduced thickness compared to the central portion 166. Referring to FIG. 1A, the perimeter portion 178 and the first material 112 define a gap 138 therebetween. The gap 138 allows the user to reach between the perimeter portion 178 and the first material 112 to remove the snap 150 from the mating rivet head 120. The snap 150 is almost completely flush with the first material 112 when received by the mating rivet 110. This tight fit is desirable for aesthetic purposes. The snap system 100 does not protrude from the first material 112 and is not an obtrusive feature. However, the gap 138 helps the user remove the snap 150 from the mating rivet head 120. The socket 160 is secured directly onto the mating rivet head 120, and the snap system 100 does not require any additional pieces to facilitate the connection. Therefore, snap system 100 can be a two piece, low-profile and non-obtrusive system. However, the snap system described herein is not limited to a two-part construction and can further comprise other adjustable components.

FIG. 5C illustrates a second embodiment of the snap 250, which is associated with the mating rivet 210 and snap system 200. The snap 250 is similar to snap 150 and similar reference numbers are used to describe the snap 250. For example, the snap 250 comprises a cap 280 and a socket 260, which are similar to the cap 180 and the socket 160 of snap 150. The cap 280 comprises a post 288. The post 288 comprises a tail 290, where the tail 290 deforms to secure the socket 260. The socket 260 comprises a perimeter rim 278 that facilitates the releasable connection between the snap 250 and the mating rivet head 220.

The snap can be formed from a polymeric material. In some embodiments, the polymeric material is Polyoxymethylene (POM). Forming the snap from POM allows it to easily deform around a steel mating rivet. Further, POM is a thermoplastic material having a high tensile strength that can deform as the socket and mating rivet head are interfaced.

As discussed above, the snap system provides several advantages over the art. The mating rivet is multi-functional, which reduces the number of parts required to secure a material and attach removable components. The mating rivet eliminates the need for a pin and a base to secure an attachment point, which is required in a traditional snap system. Further, the mating rivet provides a durable attachment point that is formed integrally with a rivet. The mating rivet can be used with a variety of material thicknesses because the shank sections bend and cooperate as needed with the material. The mating rivet is a waterproof feature that does not require a cover when it is expose and not mating with the snap. Further, the mating rivet head is a low-profile feature that lies flush with a material. Because the mating rivet does not protrude from the material, it is a non-obtrusive feature that is protected from wear.

III. Rivet as Applied to a Golf Bag

The snap system described herein can be applied to a variety of materials and has many applications including but not limited to securing removable components to tents and sports bags or securing a tarp to a different material. One application of the snap system is to a golf bag. A golf bag comprises structural components such as a flat, a base, and a divider top, where the structural components are permanently secured to one another. Some golf bags further comprise removable components or accessories such as a rain hood or a golf towel. In some golf bags, traditional rivets are used to secure the structural components, and a traditional snap system is used to secure the removable components. Referring to FIG. 7A, a first embodiment of the golf bag 1000 further comprises snap system 100 as discussed above, where the snap system 100 comprises a mating rivet 110 and a snap 150. The mating rivet 110 secures both the structural components and the removable components.

Referring to FIG. 6, the golf bag 1000 comprises a flat 1010 having an upper portion 1014, a lower portion, an exterior side 1012, and an interior side 1013. The flat 1010 can further comprise one or more layers. Referring again to FIGS. 7A and 7B, the flat 1010 can comprise two layers, where an outer layer 1020 is formed from the flat material, and the inner layer 1022 is formed from polyethylene. The inner layer 1022 comprises a hook and loop fastener 1036 for securing the divider top. The flat 1010 defines a plurality of flat apertures (hereafter referred to as "flat apertures") near the upper portion 1014, where the flat apertures extend through the one or more layers from the interior side 1013 to the exterior side 1012. The flat apertures are configured to receive a plurality of mating rivets 110 (hereafter referred to as "mating rivets"). The mating rivets 110 are capable of securing the multi-layer flat 1010 to other structural components of the golf bag 1000.

The golf bag 1000 further comprises a divider top 1030 that separates the golf clubs into different compartments. The divider top 1030 is located near the flat upper portion 1014. The flat 1010 is the outermost layer of the golf bag 1000, and the divider top 1030 is positioned within the flat 1010. The divider top 1030 comprises an outer ring 1032 and a mesh layer 1034. The outer ring 1032 can be formed from polypropylene. A top portion of the mesh layer 1034 wraps over the top of the outer ring 1032 and is permanently affixed to the flat 1010 on the exterior side of the golf bag 1000. A bottom portion of the mesh layer 1034 is removably affixed to the flat inner layer 1022 via the hook and loop connection 1036. The outer ring 1032 is encapsulated between the flat 1010 and the mesh layer 1034. The flat 1010 and the divider top 1030 are structural components of the golf bag 1000, which are secured together with mating rivets 110. As such, the divider top 1030 is configured to receive mating rivets 110.

The outer ring 1032 defines a plurality of divider top apertures (hereafter referred to as "divider top apertures"), where each divider top aperture aligns with a corresponding flat aperture. The flat 1010 is secured to the divider top 1030 via the mating rivets 110, where each mating rivet 110 is received through a flat-divider top aperture pair 1050 (hereafter referred to as "the aperture").

As discussed above, the flat 1010 is the outermost layer of the golf bag 1000. The divider top 1030 is positioned within the flat 1010. Each mating rivet 110 is aligned and received within each aperture 1050 such that the head 120 is exposed on the flat exterior side 1012. The shank tail end 142 passes through the aperture 1050 to the interior side of the golf bag 1000. Therefore, the mating rivet 110 secures a multi-layer golf bag construction. The golf bag 1000 comprises a thickness measured between the flat exterior side 1012 to the inner surface of the mesh 1036. The thickness can be between 3.0 mm to 6.5 mm. In some embodiments, the thickness is between 3.00 mm to 4.50 mm, 3.50 mm to 5.00 mm, 4.00 mm to 6.50 mm, 4.50 mm to 5.00 mm, or 5.00 mm to 6.50 mm. In some embodiments, the thickness is approximately 3.00 mm, 3.25 mm, 3.50 mm, 3.75 mm, 4.00 mm, 4.25 mm, 4.50 mm, 4.75 mm, 5.00 mm, 5.25 mm, mm, 5.75 mm, 6.0 mm, 6.25, or 6.50 mm As discussed above, the mating rivet 110 comprises a head 120 and a shank 140. The head 120 comprises an upper surface 122 and a lower surface 124, where the lower surface 124 is parallel to the exterior side of the flat 1012. The head 120 is positioned on the flat exterior side 1012 such that the lower surface 124 lies flush with the flat exterior side 1012. The head 120 is configured to mate with a snap 150, which is associated with a removable component.

The shank 140 extends from the head lower surface 124 and permanently secures the flat 1010 and the divider top 1030. The shank 140 comprises a tail end 142 opposite the head lower surface 124. The tail end 142 does not provide an attachment point that mates with the snap 150. The mating rivet shank 140 is impacted, and the shank tail end 142 splits into a plurality of shank sections 144 to pinch the divider top outer ring 1032 against the head lower surface 124. The mesh layer 1034 hides the shank sections 144 from visibility on the interior side of the golf bag 1000. The shank 140 secures the structural components of golf bag 1000, while the head 120 is configured to mate with a snap 150 to secure a removable component.

The removable components are secured to the flat exterior side 1012, near the divider top 1030. The mating rivet heads 120 is exposed on the flat exterior side 1012 near the divider top 1030, and are therefore, configured to receive the removable components.

For example, the mating rivet head 120 can receive a rain hood 1040. Referring to FIG. 6, the rain hood lower perimeter 1046 comprises a plurality of snaps 150 (hereafter referred to as "snaps"). The snap 150 is illustrated in FIGS. 5A and 5B. Each snap 150 comprises a cap 180 and a socket 160, where the cap 180 is located on the rain hood exterior side 1042, and the socket 160 is located on the rain hood interior side 1043.

The rain hood 1040 defines a plurality of rain hood apertures (hereafter referred to as rain hood apertures 1048. The cap 180 comprises a post 188, where the post 188 extends through the rain hood aperture 1048 and is received within an aperture defined by the socket 160. The rain hood 1040 is pinched between the cap 180 and the socket 160 such that the cap bottom surface 184 contacts the rain hood exterior side 1042, and the socket top surface 162 contacts the rain hood interior side 1043. The socket central portion 166 defines a cavity 170 configured to receive the mating rivet head 120. The snap 150 encapsulates the mating rivet head 120 such that the cap 180 is the outermost portion of the snap system 100 when the rain hood 1040 is installed.

The rain hood 1040 is one example of a removable golf bag component, however, the mating rivet is configured to receive various removable components. The removable components can also include but are not limited to towels, bag tags, headcovers, tools, and range finders.

As discussed above, some golf bags can comprise traditional rivets that secure the structural components, and traditional snap systems that secure removable components. The mating rivet provides several advantages over traditional snap systems and traditional rivets. The mating rivet is a multi-functional fastener that provides a structural component to the golf bag as well as an attachment point for removable components. The mating rivet consolidates the attachment point of a traditional snap system with a traditional rivet, thereby reducing clutter on the flat exterior side.

Further, the mating rivet can secure thicker material than the traditional snap system, and the mating rivet shank sections self-adjust to accommodate varying material thickness. The traditional attachment point is limited to a particular material thickness. The pin does not deform and cannot be adjusted for a material having a variable thickness, and the base is formed from a weak material that is not capable of securing a thick material. The traditional attachment point is not a universal feature, and instead, is loose on any material that it is not sized for. The mating rivet is a universal feature that can be applied to any location on the bag because it is not restricted by material thickness. The plurality of snaps located around the bottom portion of the rain hood allows the rain hood to be quickly and efficiently attached and detached to a top portion of the golf bag. The mating rivet allows the designer to locate removable items in more locations on the bag. The mating rivet provides a sturdy attachment point for the snap as it secures the structural components of the golf bag. The traditional attachment point is secured only through an outermost layer of the flat and is not a structural component. The mating rivet described herein does not require any additional support or waterproofing components.

The mating rivet head lower surface lies flush with the exterior side of the flat and the upper surface and perimeter surface define continuous surfaces devoid of apertures. Therefore, the mating rivet is a waterproof component that does not need to be covered when the rain hood is not installed. Further, the mating rivet head does not project far beyond the exterior side of the flat, which prevents the head from snagging during the transport.

Method

The snap system described herein can be formed using various methods. In some embodiments, the method of manufacturing the snap system comprises (1) forming a mating rivet; (2) installing the mating rivet to a first material; (3) providing a snap; and (4) installing the snap to a second material.

In step one, the mating rivet can comprise a head formed integrally with a shank. In step two, an apparatus can be used to install the mating rivet to the first material, as illustrated in FIG. 4C. FIG. 4D can illustrate the apparatus deforming the shank from the original shape. The apparatus can include a press and an anvil, where the anvil can include a surface having an imprinted shape. The imprinted shape can correspond to the desired geometry of the deformed shank. The mating rivet can be positioned within an aperture of the first material. The head can be aligned with the press, and the shank can be aligned with the anvil. Referring to FIG. 4D, the press can apply a downward force to the head until the shank impacts the imprinted surface. The shank can deform according to the imprinted shape of the anvil. Referring to FIG. 4B, the shank can form one or more shank sections. In step three, the snap can comprise a cap having a post, and a socket that receives the post through an aperture. In step four, the post can be positioned through an aperture defined by the second material and further received by the aperture of the socket.

Examples

I. Example 1: Snap System 100 Compared to a Traditional Snap System 500

Further described herein is a comparison between the snap system 100 as applied to golf bag 1000 and a traditional snap system 500 as applied to golf bag 5000, as illustrated in FIGS. 7A-7D. The comparison discussed below provides an illustration of a how snap system 100 provides advantages over the traditional snap system 500. The traditional snap system 500 comprises a similar attachment point to that of snap system 100. However, the traditional snap system 500 does not provide a structural component to the golf bag 500.

Similar reference numbers are used to describe the traditional snap system 500 compared to the snap system 100, but for the inability of traditional snap system 500 to provide a structural component to the golf bag 5000. For example, snap system 500 comprises an attachment point head 520, which provides a similar function to the mating rivet head 120 of snap system 100. Similar reference numbers are also used to describe the golf bag 5000 compared to the golf bag 1000. For example, the golf bag 5000 comprises a flat 5010 and a divider top 5030, which are similar to the flat 1010 and the divider top 1030 of golf bag 1000.

Referring to FIGS. 7C and 7D, the traditional snap system 500 comprises a traditional snap 550, a traditional attachment point 510, and a base 540. The traditional snap 550 is similar to the snap 150 of snap system 100. The traditional attachment point 510 comprises a head 520 and a pin 542. The head 520 is similar to the mating rivet head 120 of the snap system 100. The traditional attachment point 510, however, does not comprise a riveting component. Instead, the head 520 comprises a pin 542, where the pin 542 is received through a flat aperture 5050 and further received by the base 540. The flat 5010 is secured between the head 520 and the base 540 such that the head 520 is on the flat exterior side 5012, and the base 540 is on the flat interior side 5013.

The main difference in the snap system 100 and the traditional snap system 500 is the structure that secures the head 520. Referring to FIG. 7B, the mating rivet 110 comprises a shank 140 that secures the flat 1010 and the divider top 1030. Referring to FIG. 7D, the traditional attachment point 510 comprises a base 540 that receives the pin 542. The base 540 and the pin 542 are not structural components and only secure the flat 5010.

The shank 140 of the snap system 100 replaces the traditional attachment point pin 542 and base 540. The shank 140 reduces the number of required parts for the snap system 100. Further, the mating rivet 110 secures a flat 1010 having a greater thickness than the flat 5010. Further, the mating rivet shank sections 144 self-adjust to accommodate varying flat thicknesses. The traditional attachment point 510 is limited to a particular flat thickness because the pin 542 does not deform and cannot be adjusted for a flat 5010 having a variable thickness. Further, the base 540 is formed from a weak material that is not capable of securing a thick flat 5010 and does not provide a structural component. Therefore, the traditional attachment point 510 is not a universal feature, and instead, is loose on any portion of the flat 5010 that it is not sized for. The mating rivet 110 is a universal feature that can be applied to any location of the bag 1000 because it is not restricted by the flat thickness. The mating rivet 110 allows the designer to locate removable items in more locations on the golf bag 1000.

A pull test further exemplified the advantages of the mating rivet 110 compared to the traditional attachment point 510. The pull test demonstrated the tensile strength of each component under the typical loading conditions created when a rain hood snap is removed from head 120, 520. The mating rivet 110, as illustrated in FIG. 7B, was formed from steel. The traditional attachment point 510, as illustrated in FIG. 7D, was formed from Polyoxymethylene.

Four samples of each component were tested. The mating rivet 110 samples were applied to a divider top for a golf bag. The divider top was formed from a single layer of polypropylene that was 4.5 mm thick. The attachment point 510 samples were applied to a woven material that resembled a golf bag flat 5010. The woven material was 0.5 mm thick. The mating rivet 110 and the traditional attachment point 510 were applied to different materials to simulate real-world applications of each component. In other words, the mating rivet 110 is a structural component and can be applied to a thicker, more rigid material than the traditional attachment point 510. However, a similar fixturing was positioned on both components.

A fixturing was positioned below the head 120, 520 of each sample such that the fixturing was between the head lower surface 124, 524 and the respective divider top or woven material. The fixturing applied a tensile force or pulled the head 120, 520 away from the respective divider top or woven material. The tensile force was applied at a 90° angle relative to the head 120, 520. The tensile force simulated a snap being ripped or pulled from each of the heads 120, 520 and demonstrated the overall strength and performance of the mating rivet 110 versus the traditional attachment point 510. The pull test results are illustrated in Table 1 below. The "Load at Failure" columns represent the load (measured in pound-force or "lbf") that each sample failed under.

TABLE 1

| | Load at Failure (lbf) | |
|---|---|---|
| | POM (original snap) | Steel Mating Rivet |
| Sample 1 | 21 | 101 |
| Sample 2 | 22 | 101 |
| Sample 3 | 7 | 97 |
| Sample 4 | 5 | 99 |
| Average | 13.75 | 99.5 |

Referring to Table 1 above, the average traditional attachment point 510 failed under a load of 13.75 lbf. The average mating rivet 110 failed under a load of 99.5 lbf. The mating rivet 110 yielded a 623.64% increase in strength compared to the traditional attachment point 510.

The significant increase in strength was attributed to the geometry and the material selected for the mating rivet 110. The head 120 and the shank 140 of the mating rivet 110 were formed integrally from a steel alloy. The head 120 was reinforced by the shank 140, which is typically a durable structural component. Because the head 120 was formed integrally with the shank 140, the failure of the mating rivet 110 was observed at the shank 140. Specifically, that mating rivet 110 failed where the shank sections 144 became unfolded and released from the divider top. In contrast, the failure of the traditional attachment point 510 was observed at the head 520. The head 520 of the traditional attachment point 510 was connected to the base 540 by the pin 542. The base 540 and the pin 542 were formed from Polyoxymethylene and were not structural components capable of reinforcing the head 520. As such, failure was observed in the traditional attachment point 510 where the head 520 broke and separated from the pin 542.

Failure was observed in the traditional attachment point 510 samples at much lower tensile forces than the mating rivet 110 samples. Further, failure was observed at the head 520 of the traditional attachment point and at the shank sections 144 of the mating rivet. Therefore, the head 120 of the mating rivet 110 was stronger than the head of the traditional attachment point 510. Based on the increased strength of the head 120, the mating rivet 110 was overall more durable than the traditional attachment point 510. The pull test demonstrated that the mating rivet 110 provides significant performance improvements over the traditional attachment point 510. The improved performance was attributed to the integrally formed head 120 and shaft 140 of the mating rivet 110 in combination with the steel alloy material that formed the mating rivet 110.

II. Example 2: Snap System 200 Compared to a Traditional Snap System 600

Further described herein is a comparison between the snap system 200 as applied to the golf bag 1000 and a traditional snap system 600 as applied to a golf bag 6000, as illustrated in FIGS. 8A-8D. The comparison discussed below provides an illustration of a how the snap system 200 provides advantages over the traditional snap system 600. The traditional snap system 600 comprises additional components in comparison to snap system 200.

Similar reference numbers are used to describe the traditional snap system 600 compared to the snap system 200, but for the additional components of the snap system 600. For example, snap system 600 comprises an attachment point head 620, which provides a similar function to the mating rivet head 220. Similar reference numbers are also used to describe the golf bag 6000 compared to the golf bag 1000. For example, the golf bag 6000 comprises a flat 6010 and a divider top 6030, which are similar to the flat 1010 and the divider top 1030 of golf bag 1000.

Referring to FIGS. 8C and 8D, traditional snap system 600 comprises a traditional snap 650 and a traditional attachment point 610. The traditional snap 650 is similar to the snap 250 of snap system 200. The traditional attachment point 610 comprises a head 620 and a base 630. The traditional attachment point 610 differs from the mating rivet 210 in that the head 620 is not formed integrally with the base 630. Instead, the base 630 comprises a shank 640 that projects from the base 630 and is received through an aperture 612 defined by the head 620. The shank 640 extends toward the flat exterior side 6012 and passes through an aperture defined by the flat 6050. The shank 640 splits into several shank sections 644 in response to an impact, where the shank sections 644 press against the head 620 within the recess. The flat 6010 is secured between the head 620 and the base 630.

The snap system 200 comprises a multi-function mating rivet 210 that provides an attachment point for a snap 250 and further provides a structural component to the golf bag 1000. The mating rivet 210 is a sturdy component because the head 220 and the shank 240 are formed integrally from a strong material. In contrast, traditional snap system 600 comprises a two-part attachment point 610, where the head 620 and the shank 640 are separate components. The shank 640 extends towards the flat exterior side 6012 to secure the head 620, where the shank 240 of the mating rivet 210 extends towards the flat interior side 1013.

The mating rivet 210 consolidates the attachment point of traditional snap system 600 with a traditional rivet, thereby reducing clutter on the flat exterior side 1012. Traditional snap system 600 requires an attachment point 610 in addition to a traditional rivet. Therefore, snap system 600 does not reduce the number of required parts.

Further, traditional snap system 600 is not waterproof. The head 620 defines an aperture 612, which exposes the flat interior side 6013. The mating rivet 210 defines a continuous upper surface 222 devoid of an aperture. Therefore, snap system 200 does not require any additional waterproofing components.

Clauses

Clause 1: A snap system comprising a mating rivet and a snap, wherein: the mating rivet comprises a head and a shank, wherein: the head comprises a head upper surface, a head lower surface, and a head perimeter surface, wherein: a central portion of the head upper surface is recessed into the head towards the head lower surface to define a recess; a peripheral portion of the head upper surface defines a rim that circumscribes the recess; the head perimeter surface comprises a protrusion that projects outwardly from the head perimeter surface; and the shank extends from the head lower surface, and the shank comprises a tail end opposite the head lower surface; the snap comprises a socket having a socket top surface and a socket bottom surface and a cap having a cap top surface and a cap bottom surface, wherein: the socket top surface is proximate the cap bottom surface, and the socket bottom surface is proximate the head upper surface; the socket further comprises a central portion and a perimeter portion, wherein: the central portion defines a socket aperture extending through the socket from the socket top surface to the socket bottom surface; the central portion further defines a socket cavity recessed into the socket away from the head lower surface; the cap comprises a post extending from the cap bottom surface, wherein the post extends through the socket aperture.

Clause 2: The snap system of clause 1, wherein: the mating rivet secures a first material having an interior side and an exterior side, wherein: the first material defines an aperture extending from the interior side to the exterior side; the shank is aligned and positioned within the aperture such that the head lower surface lies flush with the exterior side, and the tail end is exposed on the interior side; and the tail end splits into a plurality of shank sections response to an impact to pinch the interior side of the first material against the head lower surface.

Clause 3: The snap system of clause 2, wherein: the snap secures a second material having an interior side and an exterior side, wherein: the second material defines an aperture extending from the interior side to the exterior side; the post is aligned and positioned through the aperture and further received within the socket aperture such that the cap bottom surface contacts the exterior side of the second material, and the socket top surface contacts the interior side of the second material; and a distal end of the post deforms in response to an impact to pinch the second material between the cap and the socket.

Clause 4: The snap system of clause 2, wherein: the head lower surface is parallel to the exterior side of the first material; the head perimeter surface is perpendicular to the exterior side of the first material; the protrusion projects from the head perimeter surface in a direction parallel to the exterior side of the first material; the protrusion is located closer to the head upper surface than the head lower surface; and the protrusion defines a transition between the rim and the head perimeter surface.

Clause 5: The snap system of clause 1, wherein the head upper surface of the head is a continuous bowl shaped surface devoid of an aperture, and the rim of the head is a continuous uninterrupted surface.

Clause 6: The snap system of clause 1, wherein the rim is rounded near the head upper surface.

Clause 7: The snap system of clause 1, wherein the head of the mating rivet defines a male component, and the socket of the snap defines a female component of the snap system.

Clause 8: The snap system of clause 1, wherein the shank is a hollow cylinder.

Clause 9: The snap system of clause 1, wherein the shank is positioned between the head and the tail end of the shank.

Clause 10: The snap system of clause 1, wherein the tail end of the shank does not provide an attachment point that mates with the snap.

Clause 11: The snap system of clause 1, wherein the shank comprises a diameter between 2.0 millimeters and 10.0 millimeters.

Clause 12: The snap system of clause 1, wherein the shank comprises a length between 8.0 millimeters and 20.0 millimeters.

Clause 13: The snap system of clause 2, wherein the first material comprises a thickness between 2.0 millimeters to 16.0 millimeters.

Clause 14: The snap system of clause 3, wherein the second material comprises a thickness between 0.20 millimeters and 4.20 millimeters.

Clause 15: The snap system of clause 1, wherein the head comprises an outer diameter between 5.0 millimeters and 10.0 millimeters.

Clause 16: The snap system of clause 1, wherein the head comprises a thickness between 1.0 millimeters to 5.0 millimeters.

Clause 17: The snap system of clause 1, wherein the recess comprises a diameter between 2.0 mm and 10.0 millimeters.

Clause 18: The snap system of clause 1, wherein the recess comprises a depth between 0.5 millimeters and 4.5 millimeters.

Clause 19: The snap system of clause 2, wherein the recess is convex relative to the first material.

Clause 20: The snap system of clause 1, wherein the head and the shank are formed integrally, and the mating rivet is formed from a single material.

Clause 21: The snap system of clause 1, wherein the mating rivet is formed from a steel alloy.

Clause 22: The snap system of clause 1, wherein the snap is formed from a polymeric material.

Clause 23: The snap system of clause 1, wherein the socket encapsulates the head of the mating rivet.

Clause 24: The snap system of clause 1, wherein: the socket cavity is recessed into the socket via a cavity wall and a cavity floor; the socket cavity comprises a variable diameter; the socket further comprises a variable thickness, wherein the thickness around the perimeter portion of the socket is less than the thickness near the central portion of the socket.

Clause 25: The snap system of clause 3, wherein the cap top surface and the cap bottom surface are concave relative to the first material.

Clause 26: The snap system of clause 3, wherein the distal end of the post forms a stud when deformed, and the stud is received within the recess of the head.

Clause 27: The snap system of clause 3, wherein the first material and the second material can be cloth, metal, or plastic.

Clause 28: The snap system of clause 1, wherein the socket cavity comprises a diameter between 5.0 millimeters and 10.0 millimeters.

Clause 29: The snap system of clause 1, wherein the socket cavity comprises a depth between 0.75 millimeters and 4.75 millimeters.

Clause 30: A golf bag comprising: a flat, a base, a divider top, and a snap system, wherein: the flat comprises an upper portion, a lower portion, an exterior side, and an interior side; the flat defines a plurality of flat apertures near the upper portion, wherein the plurality of flat apertures extend from the interior side to the exterior side; the divider top comprises a ring that defines a plurality of divider top apertures, wherein each divider top aperture aligns with a corresponding flat aperture; the snap system comprises a plurality of mating rivets and a plurality of snaps; the flat is secured to the divider top via the plurality of mating rivets, wherein each mating rivet is received through a flat-divider top aperture pair.

Clause 31: The golf bag of clause 30, wherein: each of the plurality of mating rivets comprises a head and a shank, wherein: the head comprises a head upper surface, a head lower surface, and a head perimeter surface, wherein: a central portion of the head upper surface is recessed into the head towards the head lower surface to define a recess; a peripheral portion of the head upper surface defines a rim that circumscribes the recess; the head perimeter surface comprises a protrusion that projects outwardly from the head perimeter surface; and the shank extends from the head lower surface, and the shank comprises a tail end opposite the head lower surface.

Clause 32: The golf bag of clause 31, wherein: the head lower surface is parallel to the exterior side of the flat; the head perimeter surface is perpendicular to the exterior side of the flat; the protrusion projects from the head perimeter surface in a direction parallel to the exterior side of the flat; the protrusion is located closer to the head upper surface than the head lower surface; and the protrusion defines a transition between the rim and the head perimeter surface.

Clause 33: The golf bag of clause 32, wherein: the shank is aligned and positioned within a flat-socket aperture pair such that the head lower surface lies flush with the exterior side of the flat, and the tail end is exposed on the interior side of the flat; and the tail end splits into a plurality of shank sections response to an impact to pinch the interior side of the flat against the head lower surface.

Clause 34: The golf bag of clause 31, wherein the tail end of the shank does not provide an attachment point.

Clause 35: The golf bag of clause 31, wherein each of the plurality of snaps comprises a socket having a socket top surface and a socket bottom surface and a cap having a cap top surface and a cap bottom surface, wherein: the socket top surface is proximate the cap bottom surface, and the socket bottom surface is proximate the head upper surface; the socket further comprises a central portion and a perimeter portion, wherein: the central portion defines an aperture extending through the socket from the socket top surface to the socket bottom surface; the central portion further defines a cavity recessed into the socket away from the socket bottom surface; the cap comprises a post extending from the cap bottom surface, wherein the post is received by the socket.

Clause 36: The golf bag of clause 30, further comprising a rain hood, wherein: the rain hood comprises a main portion, a lower perimeter, an exterior side, and an interior side; the rain hood defines a rain hood aperture near the lower perimeter, wherein the plurality of rain hood apertures extend from the interior side to the exterior side; and the lower perimeter comprises a plurality of snaps, wherein each snap comprises a cap and a socket.

Clause 37: The golf bag of clause 35, wherein the post is aligned and positioned through the rain hood aperture and further received within a socket aperture such that the cap bottom surface contacts an exterior side of the rain hood, the socket top surface contacts an interior side of the rain hood, and a distal end of the post deforms in response to an impact to pinch the rain hood between the cap and the socket.

Clause 38: The golf bag of clause 32, wherein the head lower surface is flush with the exterior side of the flat.

Clause 39: The golf bag of clause 30, wherein the flat comprises one or more layers, wherein the layers can be one layer, two layers, three layers, four layers, five layers, six layers, seven layers, 8 layers, 9 layers, or 10 or more layers.

Clause 40: The golf bag of clause 30, wherein a combined thickness of the flat and the divider top is between 2.0 millimeters and 7.0 millimeters.

The invention claimed is:

1. A golf bag comprising:
a flat, a base, a divider top, and a snap system, wherein:
the flat comprises an upper portion, a lower portion, an exterior side, and an interior side;
the flat defines a plurality of flat apertures proximate the upper portion, wherein:
the plurality of flat apertures extend from the interior side to the exterior side;
the divider top comprises a ring that defines a plurality of divider top apertures, wherein:
each divider top aperture aligns with a corresponding flat aperture;
the snap system comprises a plurality of mating rivets and a plurality of snaps, wherein:
each of the plurality of mating rivets comprises a head and a shank, wherein:
the head is an attachment point for a selected snap from the plurality of snaps and is formed integrally with the shank;
the head comprises a head upper surface, a head lower surface, a head perimeter surface, and a head geometry,
wherein:
the head geometry corresponds to a snap geometry to facilitate a removable connection between the mating rivet and the selected snap;
the flat is secured to the divider top via the plurality of mating rivets, wherein:
each mating rivet is received through a flat-divider top aperture pair.

2. The golf bag of claim 1, wherein a central portion of the head upper surface is recessed into the head towards the head lower surface to define a recess; a peripheral portion of the head upper surface defines a rim that circumscribes the recess; the head perimeter surface comprises a protrusion that projects outwardly from the head perimeter surface; and the shank extends from the head lower surface, and the shank comprises a tail end opposite the head lower surface.

3. The golf bag of claim 2, wherein the head lower surface is parallel to the exterior side of the flat; the head perimeter surface is perpendicular to the exterior side of the flat; the protrusion projects from the head perimeter surface in a direction parallel to the exterior side of the flat; the protrusion is located closer to the head upper surface than the head lower surface; and the protrusion defines a transition between the rim and the head perimeter surface.

4. The golf bag of claim 3, wherein the shank is aligned and positioned within a flat-socket aperture pair such that the head lower surface lies flush with the exterior side of the flat, and the tail end is exposed on the interior side of the flat; and the tail end splits into a plurality of shank sections response to an impact to pinch the interior side of the flat against the head lower surface.

5. The golf bag of claim 2, wherein the tail end of the shank does not provide an attachment point.

6. The golf bag of claim 2, wherein each of the plurality of snaps comprises a socket having a socket top surface and a socket bottom surface and a cap having a cap top surface and a cap bottom surface, wherein: the socket top surface is proximate the cap bottom surface, and the socket bottom surface is proximate the head upper surface; the socket further comprises a central portion and a perimeter portion, wherein: the central portion defines an aperture extending through the socket from the socket top surface to the socket bottom surface; the central portion further defines a cavity recessed into the socket away from the socket bottom surface; the cap comprises a post extending from the cap bottom surface, wherein the post is received by the socket.

7. The golf bag of claim 1, further comprising a rain hood, wherein: the rain hood comprises a main portion, a lower perimeter, an exterior side, and an interior side; the rain hood defines a rain hood aperture proximate the lower perimeter, wherein a plurality of rain hood apertures extend from the interior side to the exterior side; and the lower perimeter comprises a plurality of snaps, wherein each snap comprises a cap and a socket.

8. The golf bag of claim 6, further comprising a rain hood, wherein the rain hood comprises a plurality of rain hood apertures, wherein the post is aligned and positioned through each aperture of the plurality of rain hood apertures and further received within a socket aperture such that the cap bottom surface contacts an exterior side of the rain hood, the socket top surface contacts an interior side of the rain hood, and a distal end of the post deforms in response to an impact to pinch the rain hood between the cap and the socket.

9. The golf bag of claim 1, wherein the head comprises a thickness between 1.0 millimeters to 5.0 millimeters.

10. The golf bag of claim 2, wherein the recess comprises a diameter between 2.0 mm and 10.0 millimeters.

11. The golf bag of claim 2, wherein the recess comprises a depth between 0.5 millimeters and 4.5 millimeters.

12. The golf bag of claim 1, wherein the head and the shank are formed integrally, and the mating rivet is formed from a single material.

13. The golf bag of claim 1, wherein the mating rivet is formed from a steel alloy.

14. The golf bag of claim 1, wherein the plurality of snaps is formed from a polymeric material.

15. The golf bag of claim 6, wherein the socket encapsulates the head of the mating rivet.

16. The golf bag of claim 6, wherein:
the socket cavity is recessed into the socket via a cavity wall and a cavity floor;
the socket cavity comprises a varying diameter;
the socket further comprises a varying thickness, wherein the thickness around the perimeter portion of the socket is less than the thickness near the central portion of the socket.

17. The golf bag of claim 6, wherein a distal end of the post forms a stud, and the stud is received within the recess of the head.

18. The golf bag of claim 6, wherein the head of the mating rivet defines a male component, and the socket of the selected snap defines a female component of the snap system.

19. The golf bag of claim 6, wherein the perimeter portion of the socket and the exterior side of the flat define a gap.

20. The golf bag of claim 1, wherein the flat comprises one or more layers.

* * * * *